United States Patent
Moon et al.

(10) Patent No.: US 12,542,545 B2
(45) Date of Patent: Feb. 3, 2026

(54) HIGH-SENSITIVITY DELAY CELLS AND CIRCUITS OF DETECTING THRESHOLD VOLTAGE

(71) Applicant: SAMSUNG ELECTRONICS CO., LTD., Suwon-si (KR)

(72) Inventors: Byongmo Moon, Suwon-si (KR); Seongook Jung, Seoul (KR); Hohyun Chae, Seoul (KR); Taeryeong Kim, Seoul (KR); Jeonghyeok You, Seoul (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 33 days.

(21) Appl. No.: 18/626,494

(22) Filed: Apr. 4, 2024

(65) Prior Publication Data
US 2025/0119131 A1    Apr. 10, 2025

(30) Foreign Application Priority Data
Oct. 5, 2023    (KR) .......................... 10-2023-0132387

(51) Int. Cl.
*H03K 5/134*    (2014.01)
*H03K 5/00*    (2006.01)
*H03L 7/081*    (2006.01)

(52) U.S. Cl.
CPC ........... *H03K 5/134* (2014.07); *H03L 7/0812* (2013.01); *H03K 2005/00019* (2013.01)

(58) Field of Classification Search
CPC ....... G11C 7/222; G11C 7/22; G11C 11/4076; G11C 7/1066; G11C 11/407; G11C 11/4063; G11C 11/40; G11C 11/21; G11C 11/00; G11C 7/1051; G11C 7/10; G11C 7/00; H03L 7/0814; H03L 7/0816; H03L 7/087; H03L 7/0818; H03L 7/07; H03L 7/0812; H03L 7/081; H03L 7/085; H03L 7/00
See application file for complete search history.

(56) References Cited

U.S. PATENT DOCUMENTS 3,676,711 A * 7/1972 Ahrons ................ H04N 11/165
                                                327/284
7,479,816 B2    1/2009 Lee et al.
(Continued)

*Primary Examiner* — Diana J. Cheng
(74) *Attorney, Agent, or Firm* — Wolf, Greenfield & Sacks, P.C.

(57) ABSTRACT

A circuit configured to detect a threshold voltage includes a first delay circuit, a second delay circuit and a controller. The first delay circuit has a first sensitivity to threshold voltage of a transistor. The first delay circuit may be configured to generate a first output signal delayed with respect to the input signal by a first delay time that changes depending on the digital control code. The second delay circuit has a second sensitivity that is higher than the first sensitivity. The second delay circuit may be configured to generate a second output signal delayed with respect to the input signal by a second delay time. The controller may compare the first and second output signals and may generate a digital output code corresponding to the digital control code when the first delay time is equal to the second delay time to indicate the threshold voltage of the transistor.

20 Claims, 16 Drawing Sheets

(56) References Cited

U.S. PATENT DOCUMENTS

| | | |
|---|---|---|
| 7,633,324 B2 | 12/2009 | Yun et al. |
| 8,203,371 B2 | 6/2012 | Jeon |
| 8,390,356 B2 | 3/2013 | Shinde |
| 9,448,580 B2 * | 9/2016 | Kim .......................... G06F 1/04 |
| 9,991,879 B2 | 6/2018 | Huang |
| 10,297,297 B2 | 5/2019 | Wu et al. |
| 11,120,855 B2 | 9/2021 | Abe |
| 11,349,457 B2 * | 5/2022 | Kim ....................... H03K 3/017 |
| 2016/0020758 A1 | 1/2016 | Kim |

\* cited by examiner

HIGH-SENSITIVITY DELAY CELLS AND CIRCUITS OF DETECTING THRESHOLD VOLTAGE

CROSS-REFERENCE TO RELATED APPLICATION

This U.S. non-provisional application claims priority under 35 USC § 119 to Korean Patent Application No. 10-2023-0132387, filed on Oct. 5, 2023, in the Korean Intellectual Property Office (KIPO), and the entire contents of the above-identified application are incorporated by reference herein.

BACKGROUND

1. Technical Field

The present disclosure relates generally to semiconductor integrated circuits, and more particularly to high-sensitivity delay cells and circuits of detecting threshold voltages of transistors using the high-sensitivity delay cells.

2. Discussion of the Related Art

As process miniaturization continues to progress according to Moore's Law, variables such as threshold voltage and channel length of transistors such as metal oxide semiconductor field effect transistors (MOSFETs) also become smaller. During this miniaturization process, the influence of process variation has increased. Because these process variations may be critical (and may be very critical) to performance of integrated circuits, designers of semiconductor integrated circuits have to take them into account.

Among the variables according to the process variations, the threshold voltage may have a relatively large influence on the performance and power of the integrated circuits, and thus the integrated circuits have to be designed with the variation of the threshold voltage in consideration. Additionally, as semiconductor chips become more complex, on-chip calibration becomes more important, and thus the need for a circuit that detects the threshold voltage inside a semiconductor chip is increasing. This threshold voltage detection circuit may have a requirement to be able to operate in a variety of environments in order to operate on-chip. As reducing power consumption becomes more important, many circuits that operate at low voltages are increasingly desired. The threshold voltage detection circuit has to be designed to operate in such environments.

Also, dynamic voltage and frequency scaling (DVFS), which may change the operation clock frequency in various circuits such as a processor, a memory interface, etc., are being applied for power management, and thus the operation clock frequency of the threshold voltage detection circuit may be changed frequently. To operate in such environments, the threshold voltage detection circuit has to be able to operate in a wide frequency range.

SUMMARY

Some example embodiments may provide a circuit capable of detecting a threshold voltage of a transistor in a relatively efficient manner.

Some example embodiments may provide a delay cell having a high sensitivity to threshold voltage of a transistor.

According to some embodiments, a circuit of detecting threshold voltage may include a first delay circuit, a second delay circuit and a controller. The first delay circuit may have a first sensitivity to a threshold voltage of a transistor. The first delay circuit may be configured to receive an input signal and a digital control code and may generate a first output signal delayed with respect to the input signal by a first delay time that changes depending on the digital control code. The second delay circuit may have a second sensitivity that is higher than the first sensitivity. The second delay circuit may be configured to receive the input signal and may generate a second output signal delayed with respect to the input signal by a second delay time. The controller may compare the first output signal and the second output signal by changing the digital control code and may generate a digital output code corresponding to the digital control code in response to the first delay time being equal to the second delay time such that the digital output code indicates the threshold voltage of the transistor.

According to some embodiments, a circuit of detecting threshold voltage may include a pulse generator configured to generate an input pulse signal based on an input clock signal, a first delay circuit having a first sensitivity to a threshold voltage of a transistor, the first delay circuit configured to receive the input pulse signal and a digital control code and generate a first output signal delayed with respect to the input pulse signal by a first delay time that changes depending on the digital control code. a second delay circuit having a second sensitivity that is higher than the first sensitivity, the second delay circuit configured to receive the input pulse signal and generate a second output signal delayed by a second delay time with respect to the input pulse signal, a phase detector configured to generate a phase detection signal by comparing a phase of the first output signal and a phase of the second output signal, and a control logic circuit configured to generate the digital control code that increases or decreases depending on a logic level of the phase detection signal.

According to some embodiments, high-sensitivity delay cell include a first P-type metal oxide semiconductor (PMOS) transistor connected between a cell input node and a first node and having a gate electrode configured to receive a mode signal, a first N-type metal oxide semiconductor (NMOS) transistor connected in parallel with the first PMOS transistor between the cell input node and the first node and having a gate electrode configured to receive the mode signal, a buffer circuit connected between the cell input node and a second node, a boosting capacitor connected between the first node and the second node, a second PMOS transistor connected between a power supply voltage and a third node and having a gate electrode connected to the first node, a second NMOS transistor connected between a ground voltage and the third node and having a gate electrode connected to the first node, a third PMOS transistor connected between the power supply voltage and a cell output node and having a gate electrode connected to the third node, and a third NMOS transistor connected between the ground voltage and the cell output node and having a gate electrode connected to the third node.

The high-sensitivity delay cell according to some example embodiments may reduce area overhead and increase delay time variation according to threshold voltage variation of the transistor by increasing sensitivity to the threshold voltage, using reconfigurable pass transistors. In addition, the high-sensitivity delay cell may operate even at a relatively low operation voltage by increasing the overdrive voltage using the boosting capacitor.

The circuit of detecting threshold voltage according to some embodiments may detect (e.g., detect relatively precisely) the threshold voltage of the transistor and operate even at a relatively low operation voltage, using the high-sensitivity delay cell. In addition, the circuit of detecting threshold voltage may operate robustly despite changes in the operation clock frequency over a wide frequency range by adopting a digital delay-locked loop scheme.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
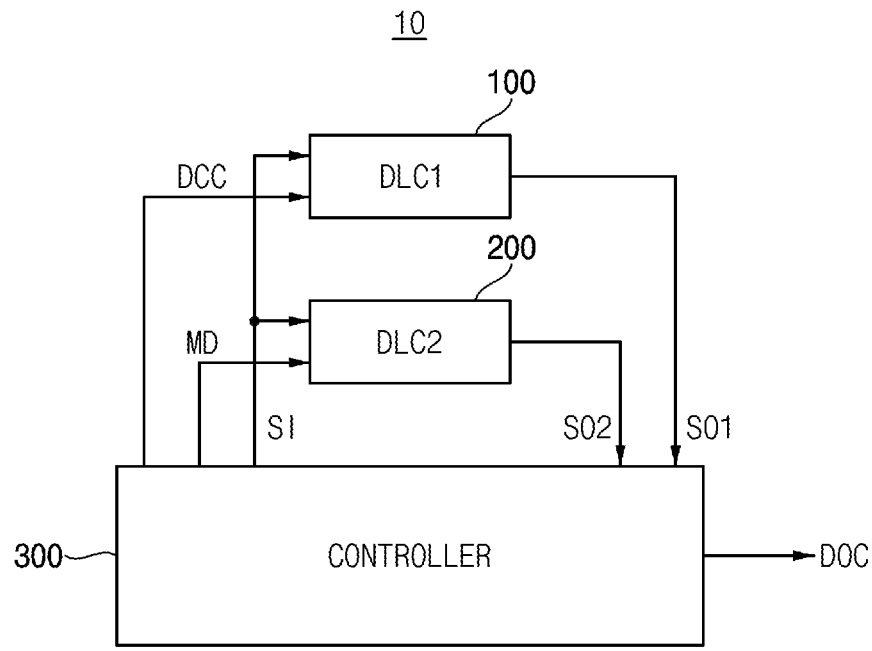
FIG. 1 is a block diagram illustrating a threshold voltage detection circuit according to some embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a threshold voltage detection circuit according to some example embodiments.

Referring to FIG. 1, a threshold voltage detection circuit 10 may include a first delay circuit (DLC1) 100, a second delay circuit (DLC2) 200, and a controller 300.

The first delay circuit 100 may have a first sensitivity to a threshold voltage of a transistor, and the second delay circuit 200 may have a second sensitivity greater than the first sensitivity. As used herein, a sensitivity to the threshold voltage of the transistor being large or relatively greater does not indicate that the threshold voltage itself is large, but rather, may indicate that a variation in delay time according to a variation of the threshold voltage is relatively large.

The first delay circuit 100 may receive an input signal SI and a digital control code DCC and may generate a first output signal SO1 that is delayed with respect to the input signal SI by a first delay time that may change depending on the digital control code DCC. The second delay circuit 200 may receive the input signal SI and may generate a second output signal SO2 that is delayed with respect to the input signal SI by a second delay time. The first delay time of the first output signal SO1 may change depending on or based on the digital control code DCC, but the second delay time of the second output signal SO2 may be constant regardless of the digital control code DCC. Accordingly, in some embodiments, the second delay circuit 200 may not receive (e.g., may not be configured to receive) the digital control code DCC. Some examples of embodiments of the first delay circuit 100 and the second delay circuit 200 will be described in greater detail below with reference to FIGS. 2 through 10.

As will be described below with reference to FIGS. 7 through 10, the second delay circuit 200 may include a delay line in which a plurality of high-sensitivity delay cells having the second sensitivity are connected in series.

The high-sensitivity delay cell according to some example embodiments may include reconfigurable pass transistors to increase sensitivity to the threshold voltage of the transistor, thereby reducing area overhead and increasing delay time variation due to variation in threshold voltage. Additionally, the high-sensitivity delay cell according to some example embodiments may operate (e.g., operate robustly) even at a low operation voltage by increasing the overdrive voltage using a boosting capacitor as will be described below.

The controller 300 may compare the first output signal SO1 and the second output signal SO2 by changing the digital control code DCC and may generate a digital output code DOC corresponding to the digital control code DCC when the first delay time is equal to the second delay time such that the digital output code DOC indicates the threshold voltage of the transistor. Example embodiments of the controller 300 will be described below with reference to FIG. 11.

A conventional threshold voltage detector uses a time-to-digital converter (TDC) to detect changes in the pulse width of a signal generated from a ring oscillator based on a ratioed inverter according to changes in the threshold voltage. In addition, the conventional threshold voltage detector is equipped with both N-type and P-type ring oscillators to detect changes in the threshold voltage of each type separately. In this case, instead of using a typical delay unit (e.g., a CMOS inverter) to reduce area overhead, a diode-connected transistor is used as a load transistor or a ratioed transistor. This scheme may increase process sensitivity. However, since there is no means for a low-voltage environment, if the swing of signal is excessively reduced, the threshold voltage detector may not operate normally. Additionally, since TDC is used as a circuit to read changed signals, errors occur when the operation clock frequency changes.

Another conventional threshold voltage detector consists of a ring oscillator including leakage monitor cells and a controller that may change the mode or control the on/off of the transistor to be detected. In this case, area overhead may be reduced due to high process sensitivity in that the threshold voltage is measured using leakage current. This is because the leakage current is exponentially inversely proportional to the threshold voltage, as shown in Expression 1.

$$I_{ds} \propto \exp\left(\frac{-Vth}{n_n V_T}\right) \qquad \text{Expression 1}$$

In Expression 1, Ids represents the leakage current of the transistor, Vth represents the threshold voltage of the transistor, $n_n$ and V are constants, and T represents the absolute temperature.

However, in this case, it may take a relatively long time for a signal to be generated due to leakage current, and it may be difficult to use in environments that require quick operation. This method may be difficult to use in structures that require a high sampling rate.

On the other hand, the threshold voltage detection circuit 10 according to example embodiments may detect (e.g., detect relatively more precisely) the threshold voltage of the transistor using a high-sensitivity delay cell and may operate (e.g., operate robustly) even at a relatively low operation voltage. In addition, the threshold voltage detection circuit 10 may adopt a digital delay-locked loop scheme and may operate (e.g., operate robustly) despite changes in the operation clock frequency over a relatively wide frequency range.

Figure 2:
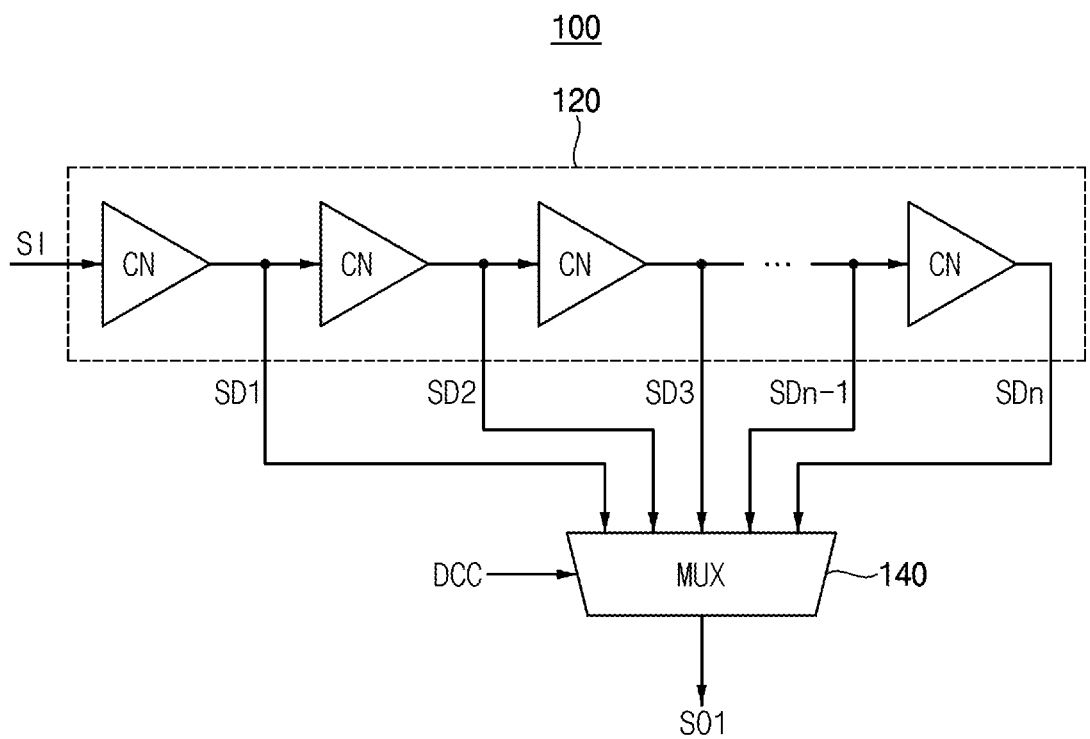
FIG. 2 is a diagram illustrating an example embodiment of a first delay circuit included in a threshold voltage detection circuit according to some embodiments.

FIG. 2 is a diagram illustrating an example of an embodiment of a first delay circuit included in a threshold voltage detection circuit according to some example embodiments.

Referring to FIG. 2, a first delay circuit 100 may include a first delay line 120 and a selector (MUX) 140.

The first delay line 120 may include a plurality of normal delay cells CN having a first sensitivity connected in series. The first delay line 120 may receive the input signal SI and may generate a plurality of delay signals SD1-SDn having different delay times with respect to the input signal SI.

The selector 140 may select one of the plurality of delay signals SD1-SDn based on the digital control code DCC and provide a selected delay signal as the first output signal SO1.

Figure 3:
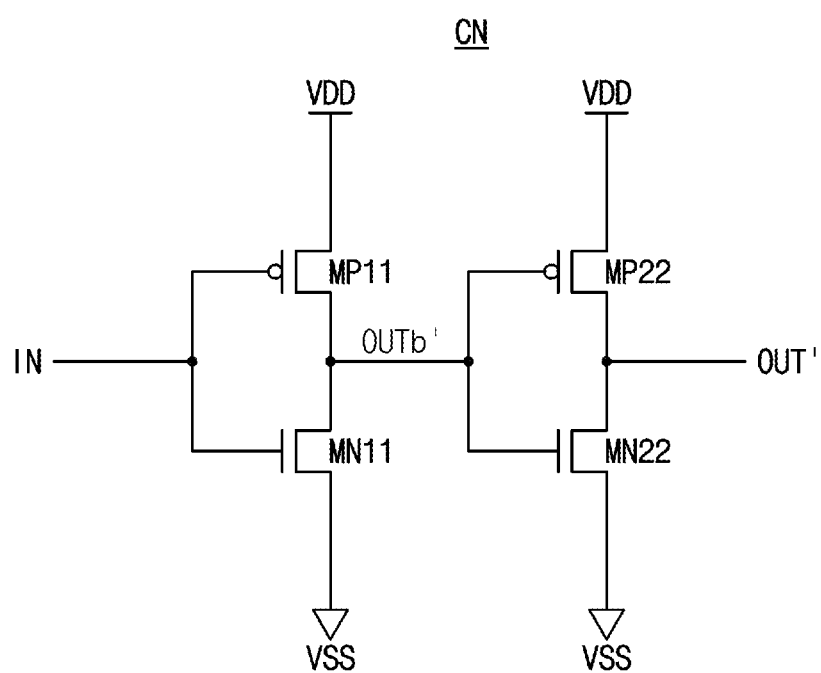
FIG. 3 is a circuit diagram illustrating an example embodiment of a normal delay cell included in the first delay circuit of FIG. 2.

FIG. 3 is a circuit diagram illustrating an example of an embodiment of a normal delay cell included in the first delay circuit of FIG. 2.

Referring to FIGS. 2 and 3, a normal delay cell CN may include a first PMOS transistor MP11, a first NMOS transistor MN11, a second PMOS transistor MP22, and a second NMOS transistor MN22.

The first PMOS transistor MP11 and the first NMOS transistor MN11 may form one inverter (e.g., a first inverter) and may be connected between a power supply voltage VDD and a ground voltage VSS, and may invert a cell input signal IN to generate an inverted signal OUTb.

The second PMOS transistor MP22 and the second NMOS transistor MN22 may form another inverter (e.g., a second inverter) and may be connected between the power supply voltage VDD and the ground voltage VSS, and may invert the inverted signal OUTb' to invert a cell output signal OUT'.

FIG. 3 shows a normal delay cell CN including two ordinary inverters, but the present disclosure is not limited thereto. According to some embodiments, the normal delay cell CN may have a 2-stage structure, etc., and may include four, six, etc. inverters.

Figure 4:
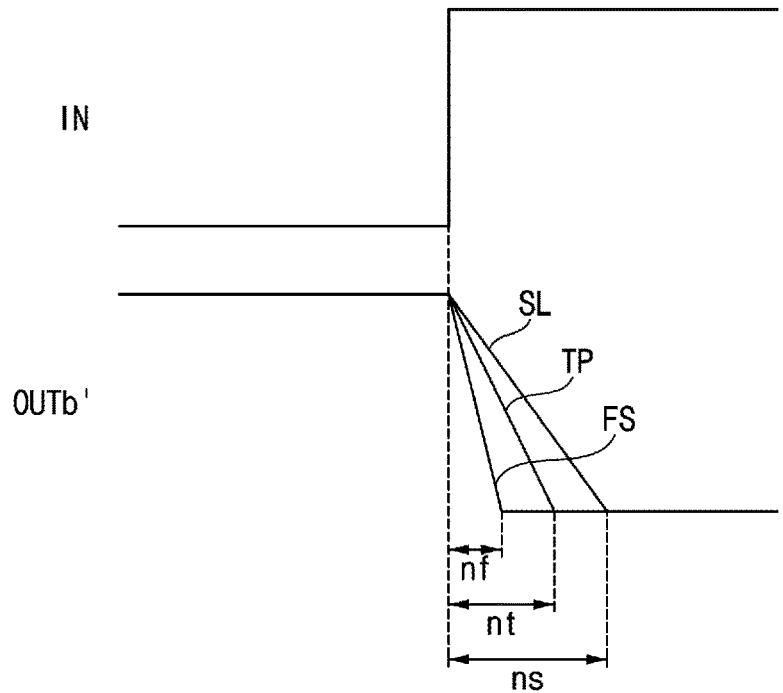
FIGS. 4 and 5 are timing diagrams illustrating operations and delay times of the normal delay cell of FIG. 3.
Figure 5:
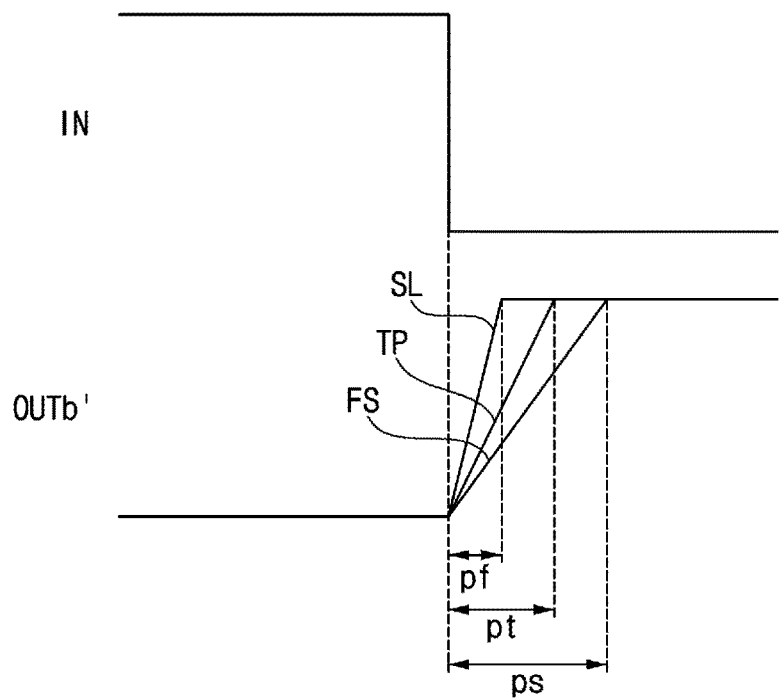

FIGS. 4 and 5 are timing diagrams illustrating operations and delay times of the normal delay cell of FIG. 3.

FIG. 4 shows an operation according to the threshold voltage of the first NMOS transistor MN11 of FIG. 3 at a rising edge when the cell input signal IN transitions from a logic low level to a logic high level. The first NMOS transistor MN11 may be a typical transistor TP with a typical threshold voltage, a fast transistor FS with a relatively low threshold voltage, or a slow transistor SL with a relatively high threshold voltage.

Compared to the falling transition time nt of the inversion signal OUTb' in the case of the typical transistor TP, the fast transistor FS has a relatively short falling transition time nf, and the slow transistor SL has a relatively long falling transition time ns.

In this way, as the threshold voltage of the first NMOS transistor MN11 increases, the switching speed at which the first NMOS transistor MN11 is turned on decreases and the delay time of the falling edge of the inverted signal OUTb' increases. The high sensitivity of the NMOS transistor indicates that the delay time changes (for example, nt-nf, ns-nt, and ns-nf in FIG. 4) due to changes in the threshold voltage of the NMOS transistor are large.

FIG. 5 shows an operation according to the threshold voltage of the first PMOS transistor MP11 of FIG. 3 at the falling edge of the cell input signal IN transitioning from a logic high level to a logic low level. The first PMOS transistor MP11 may be a typical transistor TP with a typical threshold voltage, a fast transistor FS with a relatively low threshold voltage, or a slow transistor SL with a relatively high threshold voltage.

Compared to the rise transition time pt of the inverted signal OUTb in the case of the typical transistor TP, the fast transistor FS has a relatively short rising transition time pf, and the slow transistor SL has a relatively long rising transition time ps.

In this way, as the threshold voltage of the first PMOS transistor MP11 increases, the switching speed at which the first PMOS transistor MP11 is turned on decreases and the delay time of the rising edge of the inverted signal OUTb increases. The high sensitivity of the PMOS transistor indicates that the delay time changes (for example, pt-pf, ps-pt, and ps-pf in FIG. 5) due to changes in the threshold voltage of the PMOS transistor are large.

Figure 6:
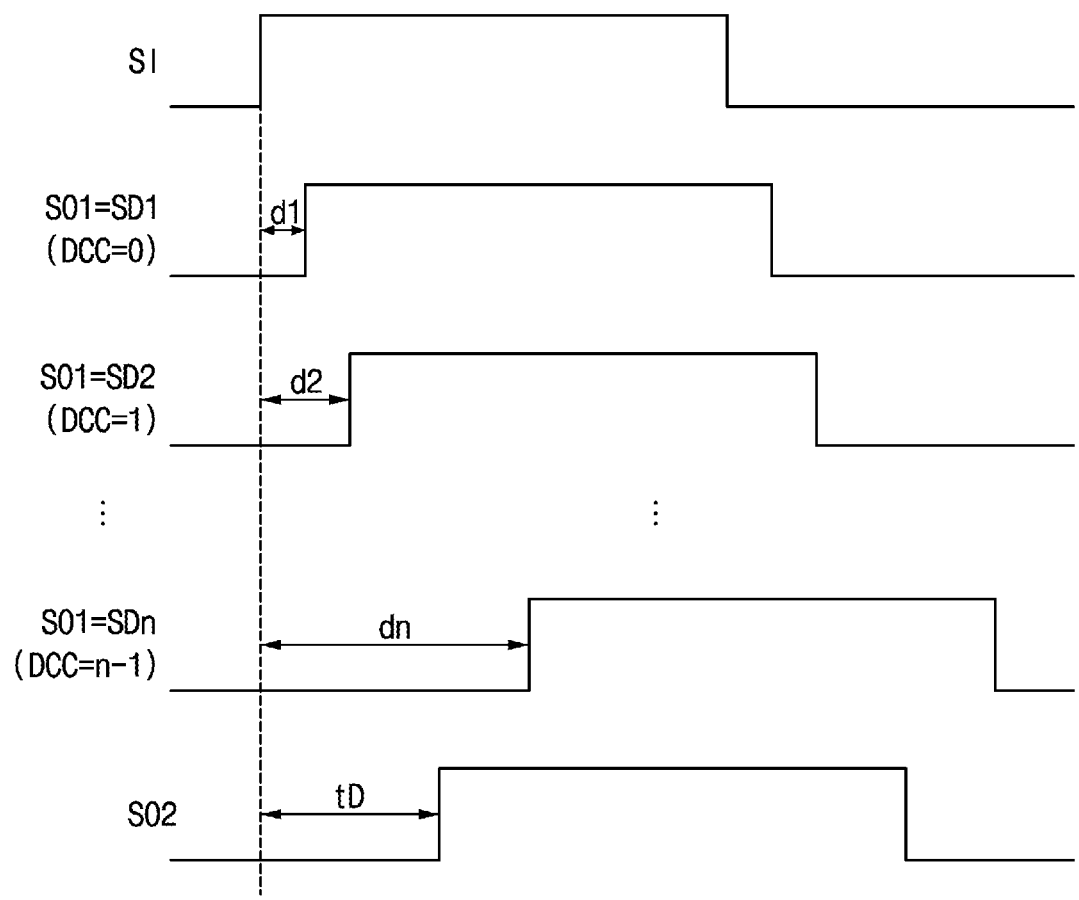
FIG. 6 is a timing diagram illustrating delay times of a first delay circuit and a second delay circuit included in a threshold voltage detection circuit according to some embodiments.

FIG. 6 is a timing diagram illustrating delay times of a first delay circuit and a second delay circuit included in a threshold voltage detection circuit according to some examples of embodiments.

Referring to FIG. 2 through 6, the first delay line 120 may include the plurality of normal delay cells CN having the first sensitivity connected in series, and the first delay line 140 may receive the input signal SI, and may generate the plurality of delay signals SD1-SDn having the different delay times with respect to the input signal SI.

The selector 140 may select one of the plurality of delay signals SD1-SDn based on the digital control code DCC and provide the selected delay signal as the first output signal SO1.

For example, when the value of the digital control code DCC is 0, the selector 140 may output, as the first output signal SO1, the delay signal SD1 delayed with respect to the input signal SI by the first delay time corresponding to d1. When the value of the digital control code DCC is 1, the selector 140 may output, as the first output signal SO1, the delay signal SD2 delayed with respect to the input signal SI by the first delay time corresponding to d2. In this way, when the value of the digital control code DCC is n−1, the selector 140 may output, as the first output signal SO1 the delay signal SDn delayed with respect to the input signal SI by the first delay time corresponding to dn.

As such, the first delay time of the first output signal SO1 may change or may be changeable depending on the digital control code DCC. For example, whenever the value of the digital control code DCC increases by 1, the first delay time may increase at regular intervals. On the other hand, whenever the value of the digital control code DCC decreases by 1, the first delay time may decrease at regular intervals.

Meanwhile, the second delay time of the second output signal SO2 may be fixed to tD regardless of the digital control code DCC, as shown in FIG. 6.

As described above, the controller 300 of FIG. 1 may compare the first output signal SO1 and the second output signal SO2 while changing the digital control code DCC to determine that the first delay time is the same as the second delay time. The digital control code DCC that causes the first delay time to be equal to or substantially the same as the second delay time may be provided as the digital output code DOC that represents the threshold voltage of the transistor.

The controller 300 may increase the digital control code DCC when the first delay time is smaller than the second delay time based on the comparison result of the first output signal SO1 and the second output signal SO2, and may decrease the digital control code DCC when the first delay time is greater than the second delay time.

Figure 7:
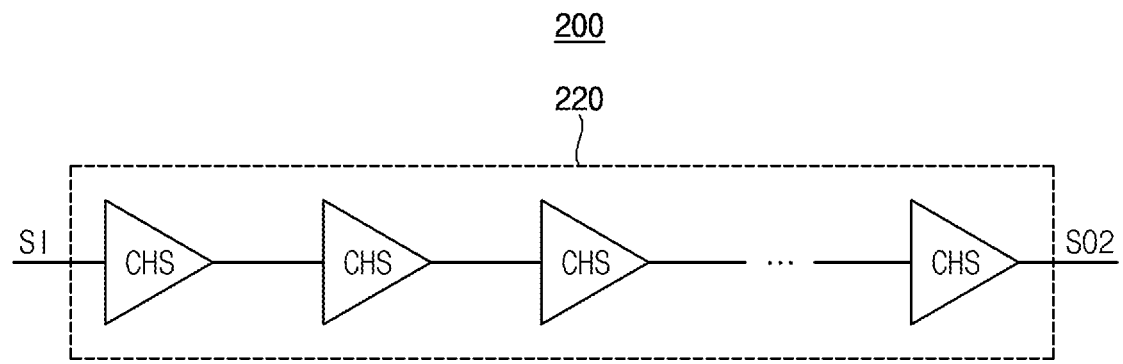
FIG. 7 is a diagram illustrating an example embodiment of a second delay circuit included in a threshold voltage detection circuit according to some embodiments.
Figure 8:
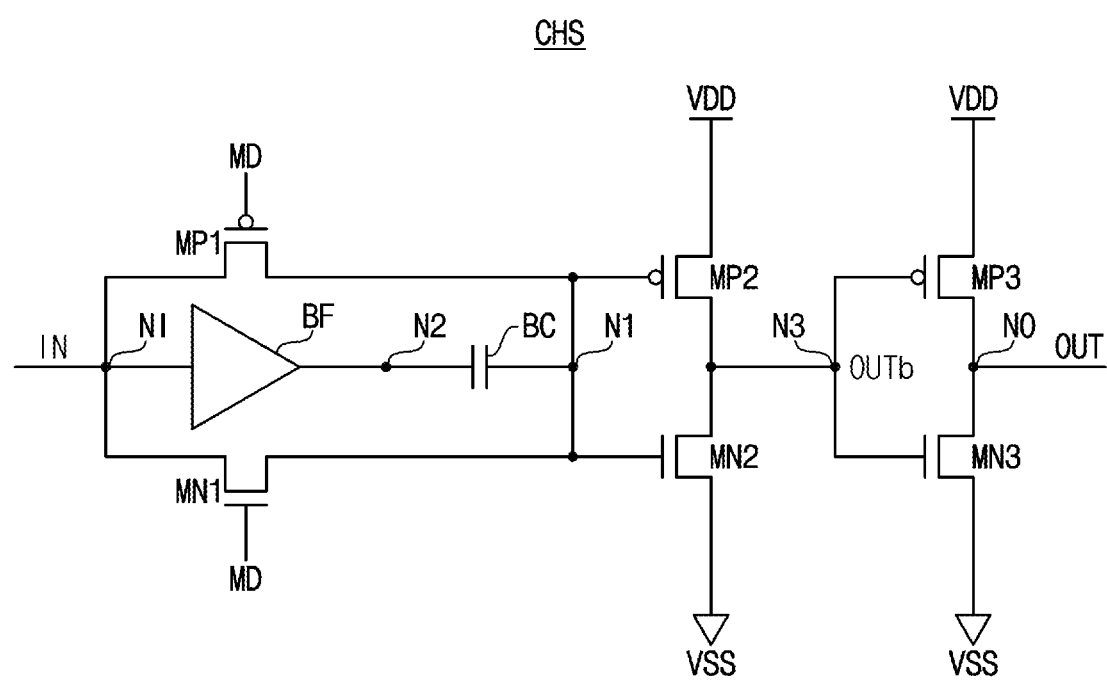
FIG. 8 is a circuit diagram illustrating a high-sensitivity delay cell according to some embodiments.

FIG. 7 is a diagram illustrating an example embodiment of a second delay circuit included in a threshold voltage detection circuit according to some example embodiments, and FIG. 8 is a circuit diagram illustrating a high-sensitivity delay cell according to some example embodiments.

Referring to FIG. 7, a second delay circuit 200 may include a second delay line 220 that includes a plurality of high-sensitivity delay cells CHS having a second sensitivity connected in series. The second delay line 220 may receive the input signal SI, and may generate the second output signal SO2. The number of the high-sensitivity delay cells CHS included in the second delay line 220 may be determined variously.

Although one high-sensitivity delay cell is shown in FIG. 8, the plurality of high-sensitivity delay cells CHS included in the second delay line 220 may all have the same configuration.

Referring to FIG. 8, each high-sensitivity delay cell CHS may include a first PMOS transistor MP1, a second PMOS transistor MP2, a third PMOS transistor MP3, a first NMOS transistor MN1, a second NMOS transistor MN2, a third NMOS transistor MN3, a buffer circuit BF and a boosting capacitor BC.

The first PMOS transistor MP1 may be connected between a cell input node NI and a first node N1, and the mode signal MD may be applied to the gate electrode. The first NMOS transistor MN1 may be connected in parallel with the first PMOS transistor MP1 between the cell input node NI and the first node N1, and the mode signal MD may be applied to the gate electrode. The first PMOS transistor MP1 and the first NMOS transistor MN1 may be referred to as pass transistors.

As will be described below, the mode signal MD may represent an NMOS detection mode for detecting the threshold voltage of the NMOS transistor or a PMOS detection mode for detecting the threshold voltage of the PMOS transistor. When the mode signal MD is at the first logic level (e.g., a logic high level), the first PMOS transistor MP1 may be turned off and the first NMOS transistor MN1 may be turned on to perform the NMOS detection mode. On the other hand, when the mode signal MD is at the second logic level (for example, a logic low level), the first PMOS transistor MP1 may be turned on and the first NMOS transistor MN1 may be turned off to perform the PMOS detection mode.

The buffer circuit BF may be connected between the cell input node NI and a second node N2, and the boosting capacitor BC may be connected between the first node N1 and the second node N2. In some example embodiments, the buffer circuit BF may include an even number of inverters connected in series (or cascaded-connected). In some embodiments, the boosting capacitor BC may be implemented as a MOS capacitor.

The second PMOS transistor MP2 may be connected between the power supply voltage VDD and a third node N3, and the gate electrode may be connected to the first node N1. The second NMOS transistor MN2 may be connected between the third node N3 and the ground voltage VSS, and the gate electrode may be connected to the first node N1. The second PMOS transistor MP2 and the second NMOS transistor MN2 that together constitute a first inverter may invert the voltage signal of the first node N1 to generate an inverted signal OUTb.

The third PMOS transistor MP3 may be connected between the power supply voltage VDD and a cell output node NO, and the gate electrode may be connected to the third node N3. The third NMOS transistor MN3 may be connected between the cell output node NO and the ground voltage VSS, and the gate electrode may be connected to the third node N3. The third PMOS transistor MP3 and the third NMOS transistor MN3 that constitute a second inverter may generate the cell output signal OUT by inverting the inverted signal (OUTb).

Figure 9:
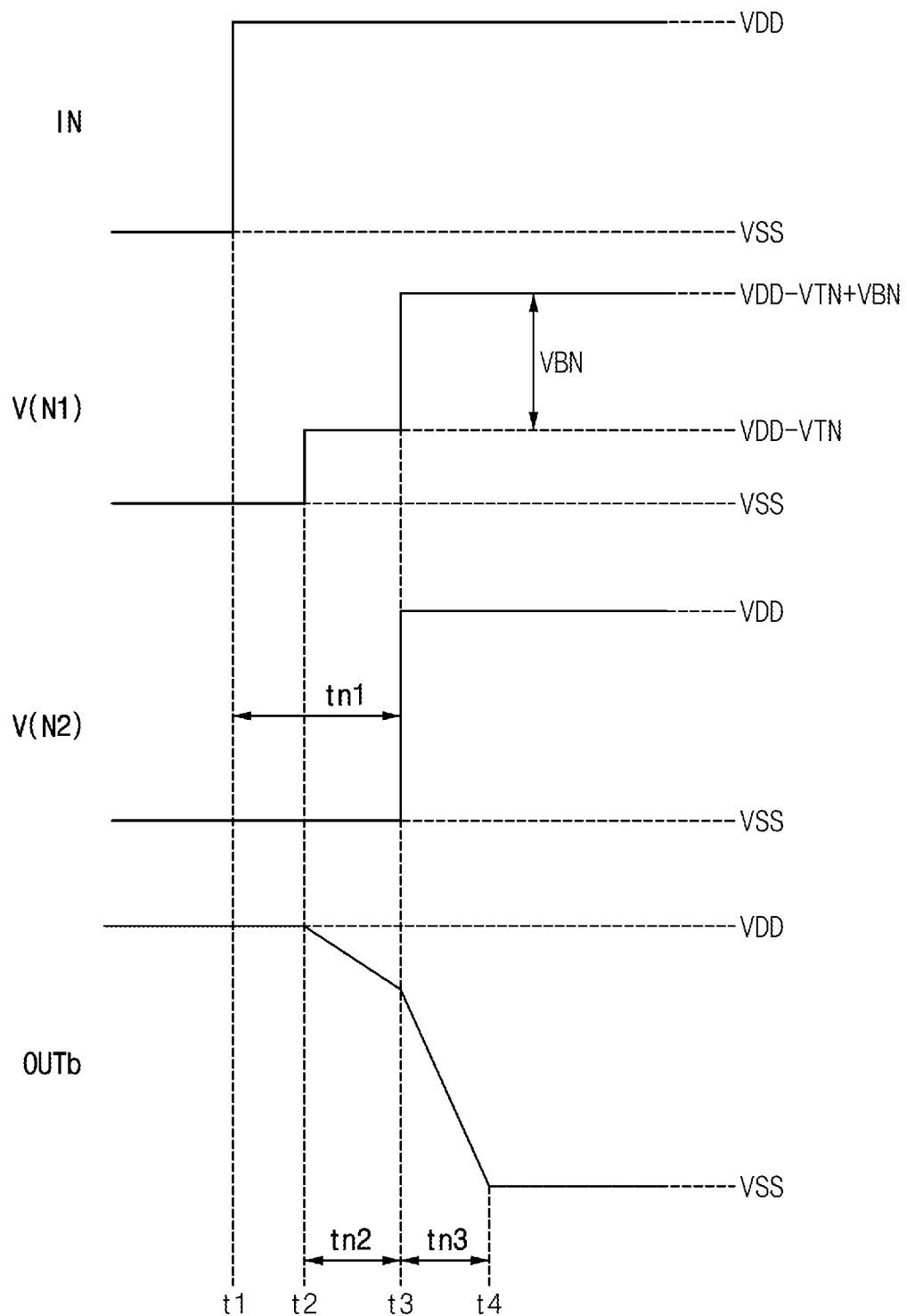
FIGS. 9 and 10 are timing diagrams illustrating operations and delay times of the high-sensitivity delay cell of FIG. 8.
Figure 10:
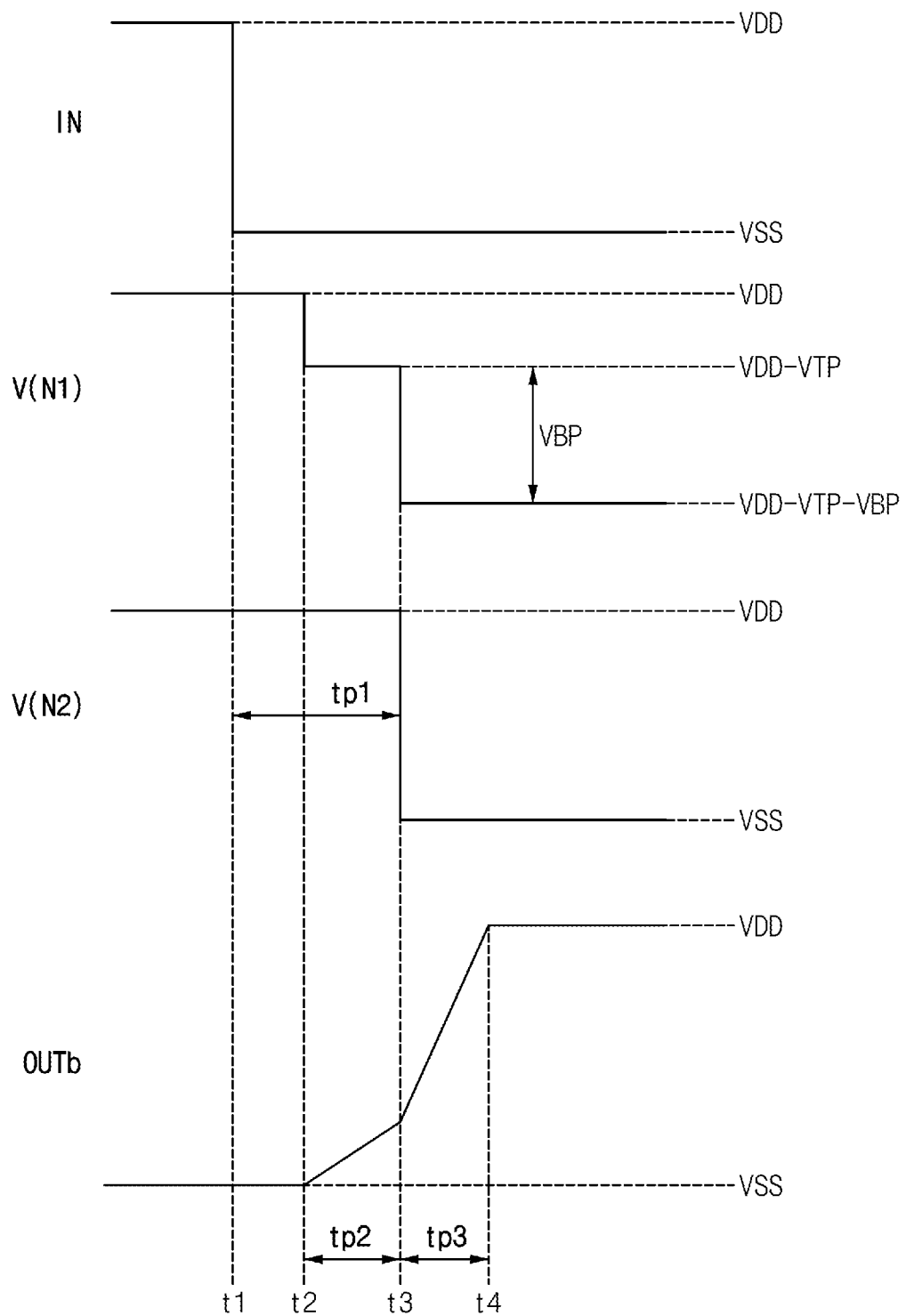

FIGS. 9 and 10 are timing diagrams illustrating operations and delay times of the high-sensitivity delay cell of FIG. 8.

FIG. 9 shows the operation according to the threshold voltage of the second NMOS transistor MN2 of FIG. 8 at the rising edge when the cell input signal IN transitions from a logic low level to a logic high level, that is, at time point t1.

Referring to FIGS. 8 and 9, when the cell input signal IN transitions from the logic low level to the logic high level at time point t2, the first NMOS transistor MN1 may be turned on and the voltage signal of the first node N1 V(N1) may rise to VDD−VTN. Here, VDD may represent the power supply voltage and VTN may represent the threshold voltage of the NMOS transistors included in the high-sensitivity delay cell CHS of FIG. 8.

Thereafter, in response to the voltage signal V(N2) of the second node N2 rising to the power supply voltage VDD at time point t3, the voltage level of the first node N1 may be increased by the boosting voltage VBN of the boosting capacitor BC. The voltage signal V(N1) may rise further to the overdrive voltage VDD−VTN+VBN. In FIG. 9, tn1 represents the delay time due to the buffer circuit BF and boosting capacitor BC.

Afterwards, the second NMOS transistor MN2 may be turned on and the inverted signal OUTb may fall to the ground voltage VSS at time point t4.

The delay of the high-sensitivity delay cell CHS may include (e.g., may consist of) a boosting delay tn2 and an inverter delay tn3. At this time, voltage may be applied through the first NMOS transistor MN1 corresponding to the pass transistor to both the second PMOS transistor MP2 and the second NMOS transistor MN2 to turn off the second PMOS transistor MP2. When the cell input signal NI transitions downward, it may be transmitted (e.g., relatively quickly transmitted) through the second NMOS transistor MN2 without any problem, but when the input signal SI transitions upward as shown in FIG. 9, a phenomenon of the threshold voltage drop may appear. Therefore, the voltage signal V(N1) of the first node N1 may become VDD-VTN. In a high power supply voltage environment, the inverter may operate normally even with a lowered input voltage, but recently, low-voltage environments (e.g., relatively lower voltage environments) such as near-threshold for low power are often used, and in such environments, it may be difficult to use the lowered voltages VDD-VTN. Therefore, when the voltage signal V(N2) of the second node N2 increases after a certain delay time tn1, the voltage signal V(N1) of the first node N1 may increase through the boosting capacitor BC. Using this additional voltage, the rear inverters MP2 and MN2 may be placed within the operation range while maintaining sensitivity to the threshold voltage. The principle of increasing sensitivity to the threshold voltage is the delay of the inverter, as will be described below. This is because it increases according to the overdrive voltage. The overdrive voltage of the inverters MP2 and MN2 is VDD−2*VTN+VBN. If VBN is considered as a constant, the amount of change in the threshold voltage may be doubled compared to a general inverter and thus a larger delay change may occur even with the same change in threshold voltage.

FIG. 10 shows the operation according to the threshold voltage of the second PMOS transistor MP2 of FIG. 8 at the falling edge when the cell input signal IN transitions from a logic high level to a logic low level, that is, at time point t1.

Referring to FIGS. 8 and 10, when the cell input signal IN transitions from the logic high level to the logic low level at time point t2, the first PMOS transistor MP1 may be turned on and the voltage signal of the first node N1 V(N1) may descend to VDD−VTP. Here, VDD represents the power supply voltage and VTP represents the threshold voltage of PMOS transistors included in the high-sensitivity delay cell CHS of FIG. 8.

Thereafter, when the voltage signal V(N2) of the second node N2 falls to the ground voltage VSS at time point t3, the voltage signal V(N1) may fall further to the overdrive voltage (VDD−VTP−VBP) by the boosting voltage VBN of the boosting capacitor BC. In FIG. 10, tp1 represents the delay time due to the buffer circuit BF and boosting capacitor BC.

Afterwards, the second PMOS transistor MP2 may be turned on and the inverted signal OUTb rises to the power supply voltage VDD at time point t4.

As described with reference to FIG. 9, the delay of the high-sensitivity delay cell CHS may include (e.g., may consist of) a boosting delay tp2 and an inverter delay tp3. As a result, the overdrive voltage of the inverters MP2 and MN2 becomes VDD−2*VTP−VBP. If VBP is considered a constant, the amount of change in threshold voltage is doubled compared to a typical inverter, and thus a larger amount of delay change may occur for the same amount of change in threshold voltage.

The alpha-power law model, a typically used delay model, may be expressed as Expression 2.

$$t_{delay} \propto \frac{VDD}{\beta_{eff}(VDD-Vth)^{\alpha}} \qquad \text{Expression 2}$$

In Expression 2, $t_{delay}$ represents the delay time of the delay cell, VDD represents the power supply voltage, Vth represents the threshold voltage of the transistor, and $\beta_{eff}$ and $\alpha$ are constants.

According to the delay model, representative variables that affect the delay unit include power supply voltage, transistor threshold voltage, transistor channel length, and mobility. Since the threshold voltage may be an independent variable with a very low correlation coefficient with channel length and mobility, the delay time may be expressed as the product of two different functions using Separating Variables, as shown in Expression 3.

$$t_{delay} = F(\beta_{eff})G(Vth) \qquad \text{Expression 3}$$

Using Expression 3, the delay time of the first delay line 120 and the delay time of the second delay line 220 having different process sensitivities of the threshold voltage may be expressed as Expression 4 and Expression 5. Expression 4 represents the first delay time of the first delay line 120 including normal delay cells CN composed of inverters as described with reference to FIGS. 3 through 5, and Expression 5 represents the second delay time of the second delay line 220 including high-sensitivity delay cells CHS composed of a boosting capacitor and the reconfigurable pass transistor according to some example embodiments as described with reference FIGS. 7 through 10.

$$t_{delay1} = F(\beta_{eff})G_1(Vth) \qquad \text{Expression 4}$$

$$t_{delay2} = F(\beta_{eff})G_2(Vth) \qquad \text{Expression 5}$$

$t_{delay1}$ in Expression 4 corresponds to the above-described first delay time, and $t_{delay2}$ in Expression 5 corresponds to the above-described second delay time.

The sensitivity according to the transconductance coefficient (beta coefficient) change may be the same, but the sensitivity according to the threshold voltage change may be different, so the G function representing the delay change according to the threshold voltage variable may be different. Afterwards, if the delay of the two delay lines is made equal through a digital delay fixing loop, it may be expressed as Expression 6.

$$N = M * G_2(Vth)/G_1(Vth) \qquad \text{Expression 6}$$

In Expression 6, N is the number of normal delay cells CN corresponding to the first output signal SO1, and M is the number of high-sensitivity delay cells CHS corresponding to the second output signal SO2.

If the number M of high-sensitivity delay cells CHS is fixed to a constant value, the number N of normal delay cells CN corresponding to the first output signal SO1 may be expressed as a function of the threshold voltage. Using this principle, the threshold voltage may be detected using the measured N value.

Since the swing of the voltage signal V(N1) of the input of the inverters MP2 and MN2, that is, the first node N1, may be reduced by the threshold voltage by the pass transistor, the sensitivity due to the change in the threshold voltage as shown in Expression 7 increases.

$$t_{delay} \propto \frac{VDD}{\beta_{eff}(V_{DD} - 2*Vth)^\alpha} \quad \text{Expression 7}$$

Compared to Expression 2, the amount of change in delay time may become relatively larger (and may become much larger relatively) even for the same amount of change in threshold voltage. However, because the input of the inverters MP2 and MN2 may be lowered from the power supply voltage VDD to the threshold voltage, there may be a problem in that the inverters MP2 and MN2 do not operate properly in the low voltage structure.

The high-sensitivity delay cell CHS according to some example embodiments may use a method of increasing the sensitivity of the delay unit by lowering the swing by the threshold voltage using a pass transistor, but the boosting capacitor BC may be added to perform voltage boosting and enable normal operation even in a low-voltage environment. This process may be expressed as Expression 8. Therefore, the high-sensitivity delay cell CHS according to some example embodiments may be free from voltage constraints and may be used in various environments, such as low-voltage interfaces.

$$t_{delay} \propto \frac{VDD}{\beta_{eff}(V_{DD} - 2*Vth + V_{Boost})^\alpha} \quad \text{Expression 8}$$

As such, the high-sensitivity delay cell CHS according to some example embodiments may use the reconfigurable pass transistors MP1 and MN1 to increase sensitivity to the threshold voltage of the transistor while reducing area overhead. The variation of delay time according to the variation of the threshold voltage may be increased. Additionally, the high-sensitivity delay cell CHS according to some example embodiments may operate robustly even at a low operation voltage by increasing the overdrive voltage using the boosting capacitor BC.

As described with reference to FIGS. 8 through 10, when the mode signal ND has a logic high level, the first NMOS transistor MN1 may be turned on and the sensitivity to the threshold voltage of the second NMOS transistor MN2 increases. On the other hand, when the mode signal MD has a logic low level, the first PMOS transistor MP1 may be turned on and the sensitivity of the second PMOS transistor MP2 to the threshold voltage may increase.

Figure 11:
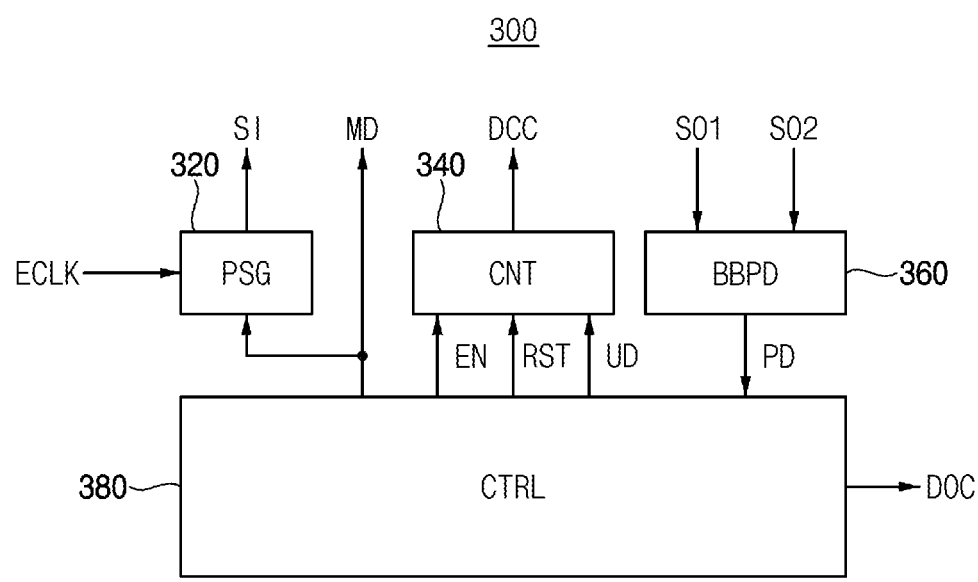
FIG. 11 is a block diagram illustrating an example of an embodiment of a controller included in a threshold voltage detection circuit according to some embodiments.

FIG. 11 is a block diagram illustrating an example of an embodiment of a controller included in a threshold voltage detection circuit according to some example embodiments.

Referring to FIG. 11, a controller 300 may include a phase detector (PSG) 320, a counter circuit (CNT) 340, a phase detector (BBPD) 360, and a control logic circuit (CTRL) 380.

The pulse generator 320 may generate an input pulse signal based on an input clock signal ECLK and may provide the input pulse signal as the input signal SI.

The phase detector 340 may generate a phase detection signal PD by comparing the phase of the first output signal SO1 and the phase of the second output signal SO2.

The counter circuit 340 may increase or decrease the value of the digital control code DCC depending on the logic level of an up-down signal UD. In some embodiments, as described below with reference to FIGS. 19 and 20, the counter circuit 340 may increase or decrease the value of the digital control value DCC one by one (e.g., increment or decrement) according to the logic level of the phase detection signal PD per the cyclic period of the input clock signal ECLK. In an example embodiment, the counter circuit 340 may include an up-down counter that operates based on the phase detection signal PD. The configuration of the up-down counter may be implemented in various ways.

The control logic circuit 380 may generate the up-down signal UD based on the phase detection signal PD. The control logic circuit 380 may provide the phase detection signal PD itself as the up-down signal UD, or may generate the up-down signal UD by adjusting the timing of the phase detection signal PD.

Additionally, the control logic circuit 380 may generate an enable signal EN and a reset signal RST which may be used in control of the counter circuit 340. The counter circuit 340 may be enabled or disabled based on the enable signal EN. The stored value of the counter circuit 340 may be reset to a predetermined initialization value based on the reset signal RST.

Additionally, the control logic circuit 380 may generate a mode signal MD indicating an NMOS detection mode for detecting the threshold voltage of the NMOS transistor or a PMOS detection mode for detecting the threshold voltage of the PMOS transistor. In some embodiments, the mode signal MD may indicate an NMOS detection mode when the mode signal MD is at the first logic level (e.g., a logic high level), and the mode signal MD indicates a PMOS detection mode when the mode signal MD is at the second logic level (e.g., a logic low level).

Figure 12:
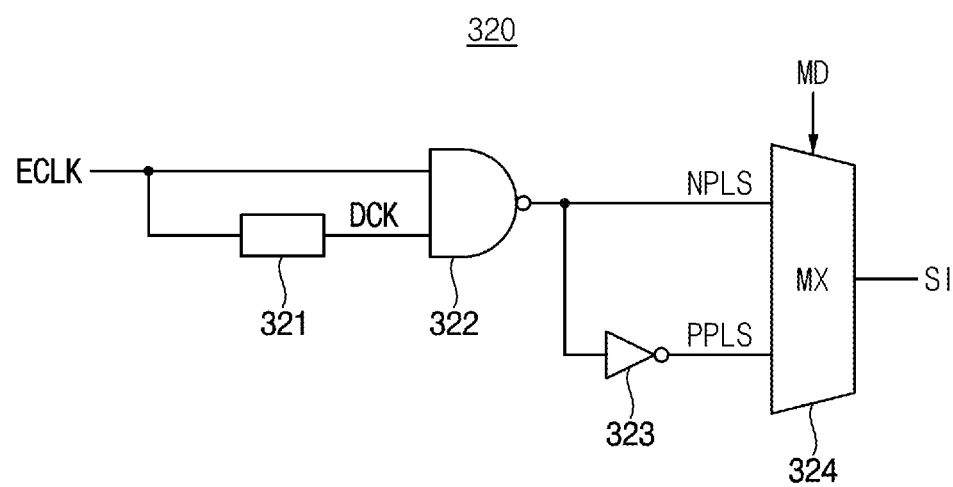
FIG. 12 is a circuit diagram illustrating an example of an embodiment of a pulse generator included in the controller of FIG. 11.
Figure 13:
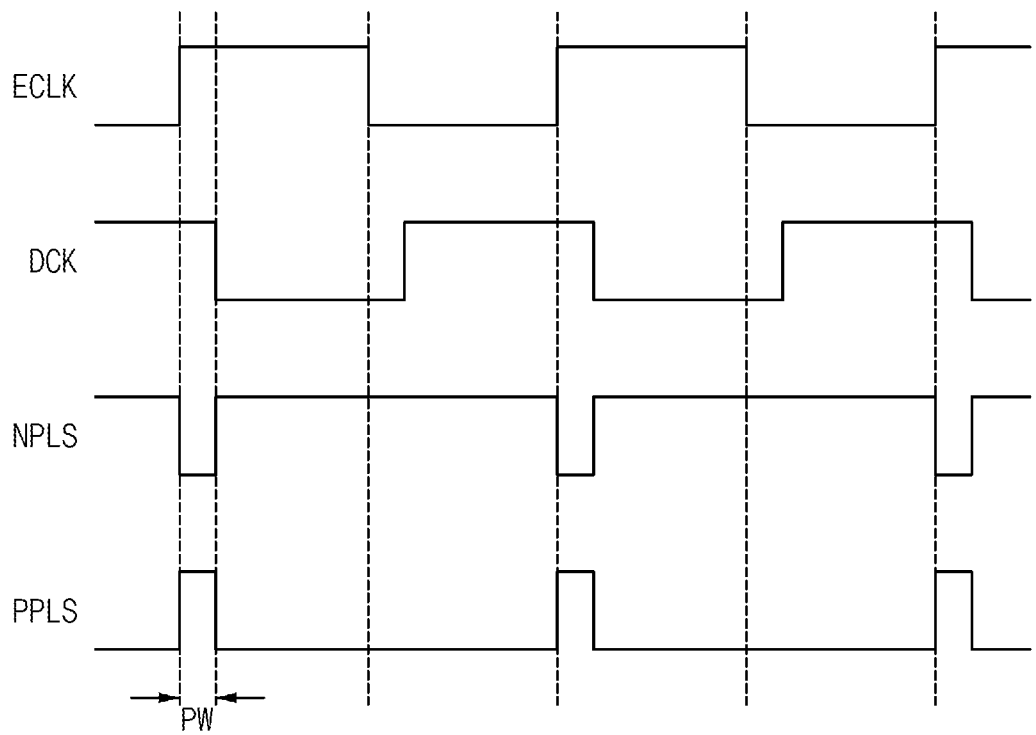
FIG. 13 is a timing diagram illustrating operations of the pulse generator of FIG. 12.

FIG. 12 is a circuit diagram illustrating an example of an embodiment of a pulse generator included in the controller of FIG. 11, and FIG. 13 is a timing diagram illustrating operations of the pulse generator of FIG. 12.

Referring to FIG. 12, the pulse generator 320 may include a delay circuit 321, a logic gate 322, and an output circuit. The output circuit may include an inverter 323 and a multiplexer (MX) 324.

Referring to FIGS. 12 and 13, the delay circuit 321 may be configured to delay the input clock signal ECLK by a certain delay time and invert it to generate an inverted-delayed clock signal DCK.

The logic gate 322 may generate a pulse signal NPLS by performing a logical operation on the input clock signal ECLK and the inverted-delayed clock signal DCK. The pulse width PW of the pulse signal NPLS may be adjusted by adjusting the delay amount of the buffer 321 in FIG. 12. FIG. 12 shows an embodiment in which the logic gate 322 is implemented as a NAND gate, an example, but the present disclosure is not limited thereto.

The inverter 323 may generate an inverted pulse signal PPLS by inverting the pulse signal NPLS.

The multiplexer 324 may provide the pulse signal NPLS or the inverted pulse signal PPLS as an input pulse signal based on the mode signal MD.

In some embodiments, when the mode signal MD is at a logic high level, the mode signal MD may represent the NMOS detection mode for detecting the threshold voltage of the PMOS transistor, and when the mode signal MD is at a logic low level, the mode signal MD may represent the PMOS detection mode for detecting the threshold voltage of the PMOS transistor. In this case, the multiplexer 324 may select the negative pulse signal NPLS activated at the logic low level when the mode signal MD is at the logic high level and may provide the negative pulse signal as the input signal SI. When the mode signal MD is at the logic low level, the multiplexer 324 may select the positive pulse signal PPLS activated at the logic high level and may provide the positive pulse signal as the input signal SI.

In this way, the pulse generator 320 may generate the negative pulse signal NPLS that is activated at the logic low level based on the input clock signal ECLK in the NMOS detection mode, and may generate the positive pulse signal PPLS that is activated at the logic high level based on the input clock signal ECLK in the PMOS detection mode.

Figure 14:
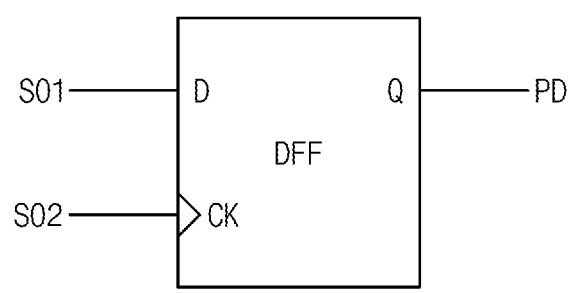
FIG. 14 is a diagram illustrating an example of an embodiment of a phase detector included in the controller of FIG. 11.
Figure 15A:
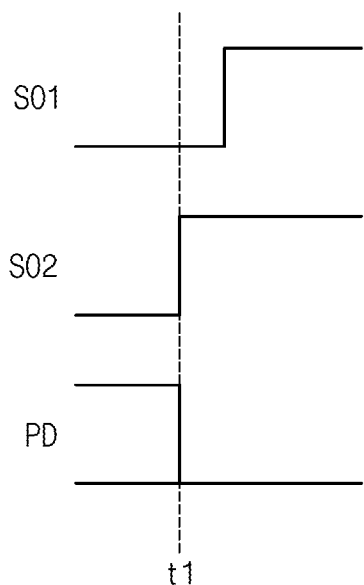
FIGS. 15A and 15B are timing diagrams illustrating operations of the phase detector of FIG. 14.
Figure 15B:
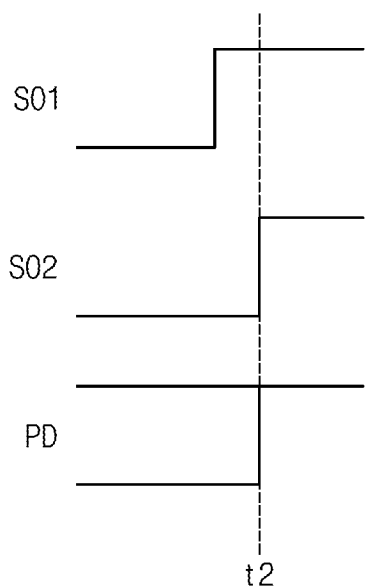

FIG. 14 is a diagram illustrating an example of an embodiment of a phase detector included in the controller of FIG. 11, and FIGS. 15A and 15B are timing diagrams illustrating operations of the phase detector of FIG. 14.

Referring to FIG. 14, the phase detector 360 may include a bang-bang phase detector that generates the phase detection signal PD by latching the logic level of the first output signal SO1 in synchronization with the edge of the second output signal SO2. In some embodiments, the bang-bang phase detector may be implemented as a D-flip-flop DFF including an input terminal D, a clock terminal CK, and an output terminal Q. The first output signal SO1 may be applied to the input terminal D of the D-flip-flop DFF, the second output signal SO2 may be applied to the clock terminal CK, and the phase signal may be output through the output terminal Q.

As shown in FIGS. 15A and 15B, the phase detector 360 may latch the logic level of the first output signal SO1 at time points t1 and t2 corresponding to the rising edge of the second output signal SO2 and may generate the phase detection signal PD. As shown in FIG. 15A, when the phase of the first output signal SO1 lags behind the phase of the second output signal SO2, the phase detection signal PD may be at a second logic level (e.g., logic low level). On the other hand, as shown in FIG. 15B, when the phase of the first output signal SO1 precedes the phase of the second output signal SO2, the phase detection signal PD may be at the first logic level (e.g., logic high level).

The counter circuit 340 of FIG. 11 may increase the value of the digital control code DCC when the phase detection signal PD has the first logic level and may decrease the value of the digital control code DCC when the phase detection signal PD has the second logic level.

Figure 16:
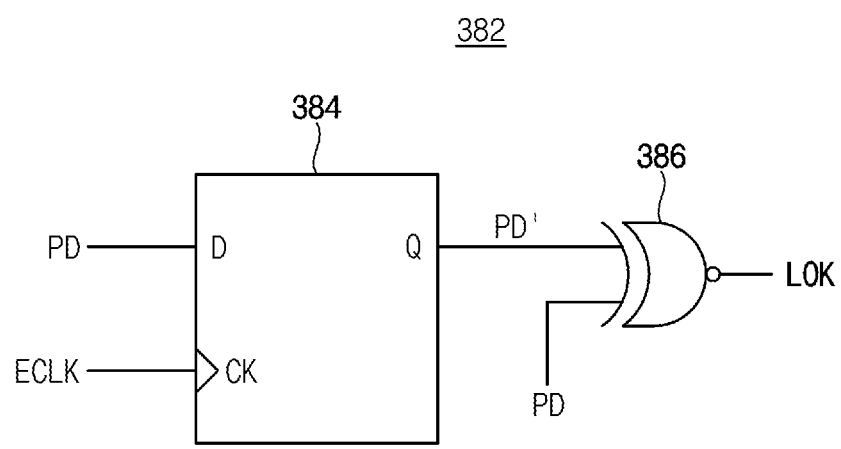
FIG. 16 is a diagram illustrating an example of an embodiment of a lock signal generator included in the controller of FIG. 11.
Figure 17:
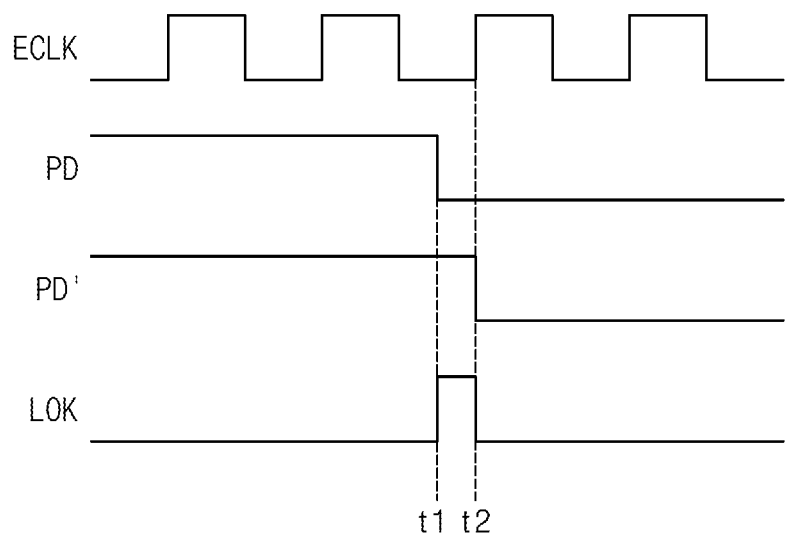
FIGS. 17 and 18 are timing diagrams illustrating operations of the lock signal generator of FIG. 16.
Figure 18:
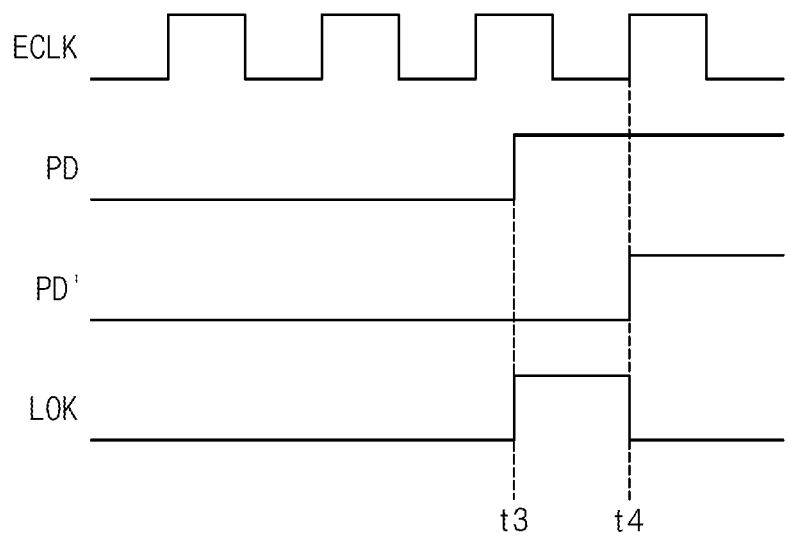

FIG. 16 is a diagram illustrating an example of an embodiment of a lock signal generator included in the controller of FIG. 11, FIGS. 17 and 18 are timing diagrams illustrating operations of the lock signal generator of FIG. 16.

Referring to FIG. 16, a lock signal generator 382 may include a D-flip-flop 384 and a logic gate 386. The phase detection signal PD may be applied to the input terminal D of the D-flip-flop 384, the input clock signal ECLK may be applied to the clock terminal CK of the D-flip-flop 384, and a previous phase detection signal PD' may be output through the output terminal Q of the D-flip-flop 384.

The logic gate 386 may generate a lock signal LOK by performing a logical operation on the phase detection signal PD and the previous phase detection signal PD'. FIG. 16 shows an example of an embodiment in which the logic gate 386 is implemented as an exclusive OR gate, that is, an XOR gate, but the present disclosure is not limited thereto.

As shown in FIG. 17, when the phase detection signal PD transitions from the logic high level to the logic low level at time point t1, the previous phase detection signal PD' may transition from the logic high level to the logic low level at time point t2 corresponding to the rising edge of the input clock signal ECLK. As a result, the lock signal LOK may be activated in the form of a pulse during time interval t1~t2.

As shown in FIG. 18, when the phase detection signal PD transitions from the logic low level to the logic high level at time point t3, the previous phase detection signal PD' may transition from the logic low level to the logic high level at time point t4 corresponding to the rising edge of the input clock signal ECLK. As a result, the lock signal LOK may be activated in the form of a pulse during time interval t3~t4.

In this way, the control logic circuit 380 of FIG. 11 may generate the lock signal LOK that is activated in response to the transition of the phase detection signal PD. The control logic circuit 380 may provide the digital control code DCC as the digital output code DOC in response to activation of the lock signal LOK. In some embodiments, the controller 380 may deactivate the enable signal EN in response to activation of the lock signal LOK. The counter circuit 340 may be disabled and may stop counting in response to deactivation of the enable signal EN, and at this time, the value stored in the counter circuit 340 may be provided as the digital output code DOC.

Figure 19:
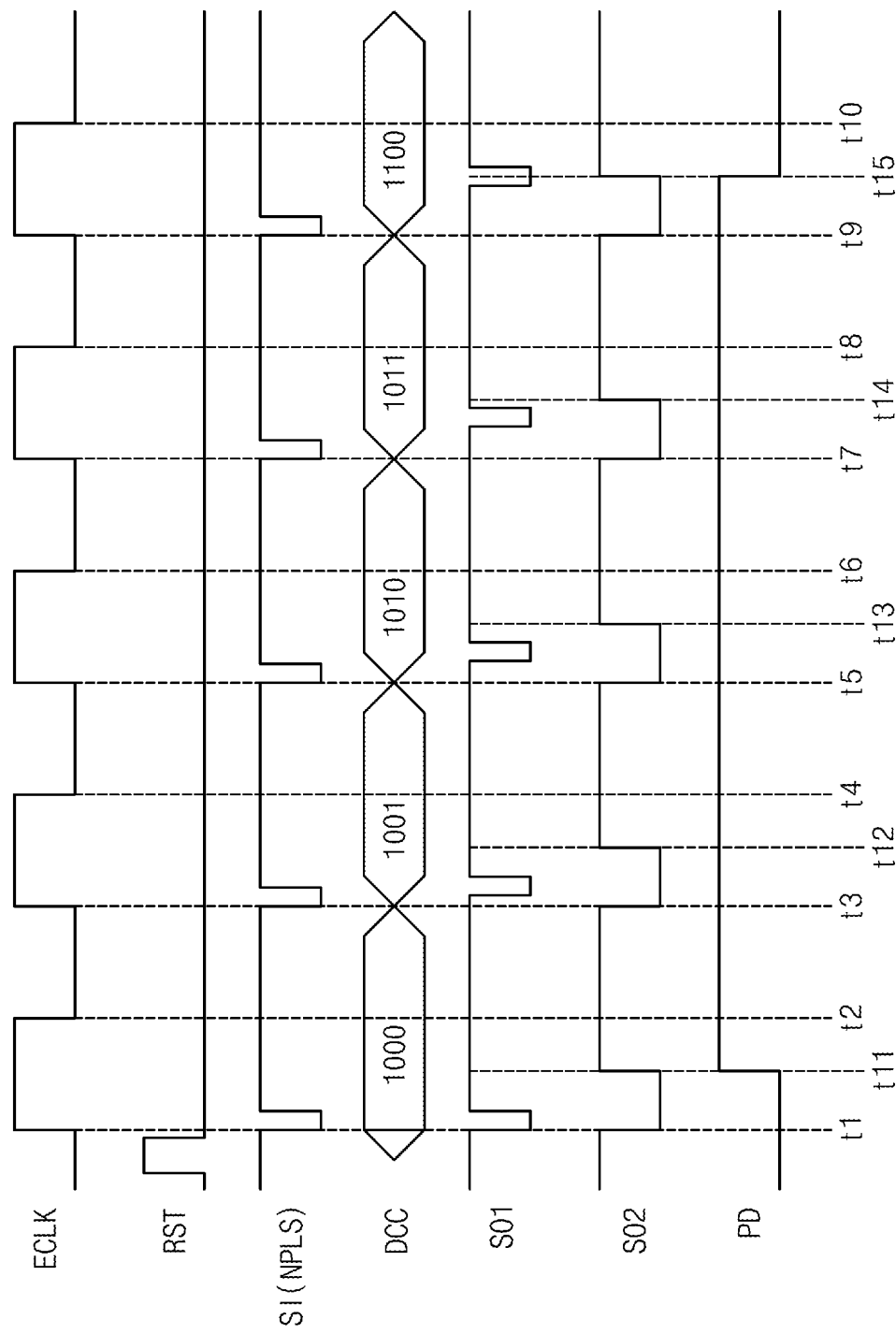
FIGS. 19 and 20 are timing diagrams illustrating operations of a threshold voltage detection circuit according to some embodiments.
Figure 20:
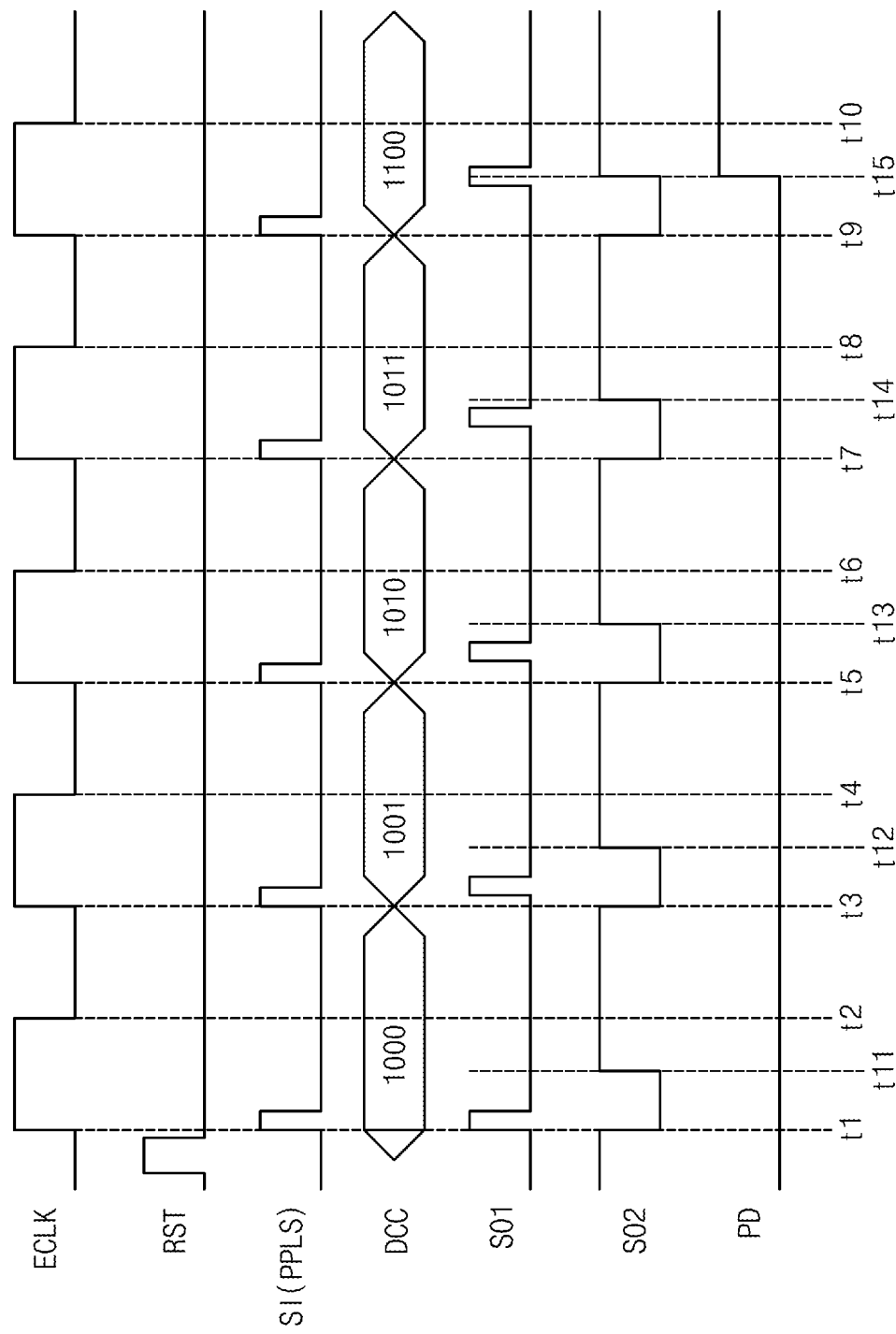

FIGS. 19 and 20 are timing diagrams illustrating operations of a threshold voltage detection circuit according to example embodiments. FIGS. 19 and 20 show overall operations of the threshold voltage detection circuit 10 described with reference to FIGS. 1 through 18. FIG. 19 shows an example of the operation of the NMOS detection mode described above, and FIG. 20 shows an example of the operation of the PMOS detection mode described above. In FIGS. 19 and 20, t1 through t10 represent edges of the input clock signal ECLK, that is, transition time points, and t11 to t15 represent rising edges, that is, rising transition time points of the second output signal SO2. FIGS. 19 and 20 show examples in which the digital control code DCC is 4 bits, but the present disclosure is not limited thereto. Depending on embodiments, the number of bits of the digital control code DCC may be implemented variously, and as the number of bits of the digital control code DCC increases, the resolution of the threshold voltage detection circuit 10 may increase.

Referring to FIG. 19, in the NMOS detection mode, the pulse generator 320 of FIG. 11 may generate the negative pulse signal NPLS that is activated at the logic low level based on the input clock signal ECLK and the negative pulse signal NPLS may be provided as the input signal SI.

In some embodiments, the counter circuit 340 of FIG. 11 may be reset to an initial value in response to the reset signal RST and may output the digital control code DCC corresponding to the initial value at time point t1. FIG. 19 shows a case where the counter circuit 340 is reset to the middle value of the digital control code DCC, that is, 1000 (binary), but the present disclosure is not limited thereto.

Since the first output signal SO1 has a relatively small first sensitivity, the pulse width of the first output signal SO1 may be similar to the pulse width of the negative pulse signal NPLS corresponding to the input clock signal ECLK. On the other hand, since the second output signal SO2 has a relatively high second sensitivity, the pulse width of the second output signal SO2 may become larger than the pulse width of the negative pulse signal NPLS. As described with reference to FIG. 9, the sensitivity of the high-sensitivity delay cells CHS of FIG. to the threshold voltage of the NMOS transistors may increase in the NMOS detection mode.

The phase detector 360 of FIG. 14 may output the phase detection signal PD having the logic high level at time points t11, t12, t13, and t14 corresponding to the rising edges of the second output signal SO2. Therefore, at time points t3, t5, t7, and t9 corresponding to the rising edges of the input clock signal ECLK, the value of the digital control code DCC may sequentially increase by 1, such as 1000, 1001, 1010, and 1100.

At time point t15 corresponding to the rising edge of the second output signal SO2, the phase detector 360 may output the phase detection signal PD having the logic low level. In other words, at time point t15, the phase detection signal PD may transition from the logic high level to the logic low level. The control logic circuit 380 of FIG. 11 may detect the time point when the first delay time of the first delay circuit 100 becomes substantially the same as the second delay time of the second delay circuit 200 based on the transition of the phase detection signal PD. For example, the control logic circuit 380 may generate the lock signal LOK as described with reference to FIG. 16 and may provide the digital control code DCC as the digital output code DOC in response to activation of the lock signal LOK. In other words, in the example of FIG. 19, the digital control code DCC with a value of 1100 at time point t15 may be provided as the digital output code DOC, and the provided value 1100 may indicate the change in the threshold voltage of the NMOS transistor.

Referring to FIG. 20, in the PMOS detection mode, the pulse generator 320 of FIG. 11 may generate the positive pulse signal PPLS that is activated at the logic high level based on the input clock signal ECLK and the positive pulse signal PPLS may be provided as the input signal SI.

In some embodiments, the counter circuit 340 of FIG. 11 may be reset to an initial value in response to the reset signal RST and may output a digital control code DCC corresponding to the initial value at time point t1. FIG. 20 shows a case where the counter circuit 340 is reset to the middle value of the digital control code DCC, that is, 1000 (binary), but the present disclosure is not limited thereto.

Since the first output signal SO1 has a relatively small first sensitivity, the pulse width of the first output signal SO1 may be similar to the pulse width of the positive pulse signal PPLS corresponding to the input clock signal ECLK. On the other hand, since the second output signal SO2 has a relatively large second sensitivity, the pulse width of the second output signal SO2 may become larger than the pulse width of the positive pulse signal PPLS. As described with reference to FIG. 10, the sensitivity of the high-sensitivity delay cells CHS of FIG. 8 to the threshold voltage of PMOS transistors may increase in the PMOS detection mode.

The phase detector 360 of FIG. 14 may output the phase detection signal PD having the logic low level at time points t11, t12, t13, and t14 corresponding to the rising edges of the second output signal SO2. Therefore, at time points t3, t5, t7 and t9 corresponding to the rising edges of the input clock signal ECLK, the value of the digital control code DCC may sequentially increase by 1, such as 1000, 1001, 1010, and 1100.

At time point t15 corresponding to the rising edge of the second output signal SO2, the phase detector 360 outputs the phase detection signal PD having the logic high level. In other words, at time point t15, the phase detection signal PD may transition from the logic low level to the logic high level. The control logic circuit 380 of FIG. 11 may detect the time point when the first delay time of the first delay circuit 100 becomes substantially the same as the second delay time of the second delay circuit 200 based on the transition of the phase detection signal PD. For example, the control logic circuit 380 may generate the lock signal LOK as described with reference to FIG. 16 and may provide the digital control code DCC as the digital output code DOC in response to activation of the lock signal LOK. In other words, in the example of FIG. 20, a digital control code DCC with a value of 1100 at time point t15 may be provided as the digital output code DOC, and the provided value 1100 may indicate the change in the threshold voltage of the PMOS transistor.

Figure 21:
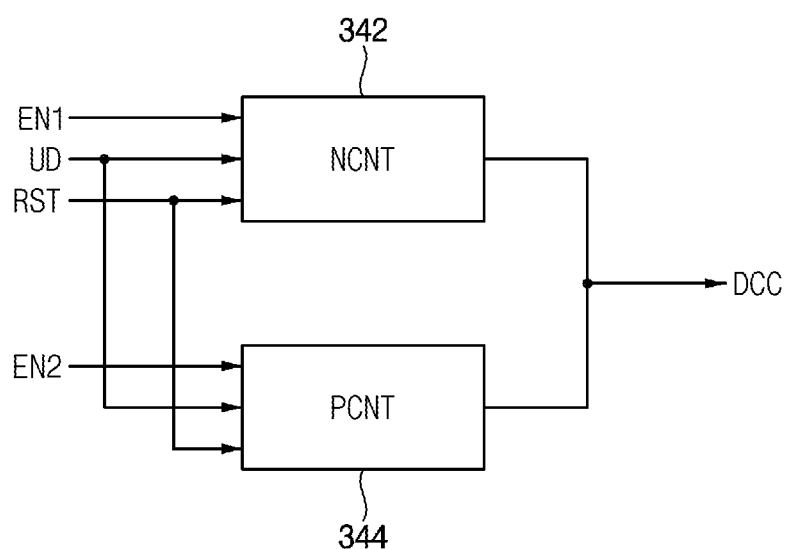
FIG. 21 is a block diagram illustrating an example of embodiment of a counter circuit included in the controller of FIG. 11.

FIG. 21 is a block diagram illustrating an example of an embodiment of a counter circuit included in the controller of FIG. 11.

Referring to FIG. 21, a counter circuit 340 may include an NMOS up-down counter (NCNT) 342 and a PMOS up-down counter (PCNT) 344.

The NMOS up-down counter 342 may be enabled in the above-described NMOS detection mode and may generate a digital control code DCC and may store a digital output code DCC representing the threshold voltage of the NMOS transistor.

The PMOS up-down counter 344 may be enabled in the above-described PMOS detection mode and may generate a digital control code DCC and may store a digital output code DCC indicating the threshold voltage of the PMOS transistor.

The NMOS up-down counter 342 may be enabled in response to activation of a first enable signal EN1, and the PMOS up-down counter 344 may be enabled in response to activation of a second enable signal EN2. The control logic circuit 380 of FIG. 11 may activate the first enable signal EN1 and may deactivate the second enable signal EN2 in the NMOS detection mode. On the other hand, the control logic circuit 380 may activate the second enable signal EN2 and may deactivate the first enable signal EN1 in the PMOS detection mode.

Each of the NMOS up-down counter 342 and PMOS up-down counter 344 may perform an up-counting operation that may increase the stored value by 1 or a down-counting operation that may decrease the stored value by 1 for each cycle period of the input clock signal ECLK according to the logic level of the up-down signal UD. The NMOS up-down counter 342 and the PMOS up-down counter 344 may reset the stored value to an initial value based on the reset signal RST.

The NMOS detection mode and the PMOS detection mode are performed sequentially, and a value representing the threshold voltage of the NMOS transistor and a value representing the threshold voltage of the PMOS transistor may be stored respectively in the NMOS up-down counter 342 and the PMOS up-down counter 344.

Figure 22:
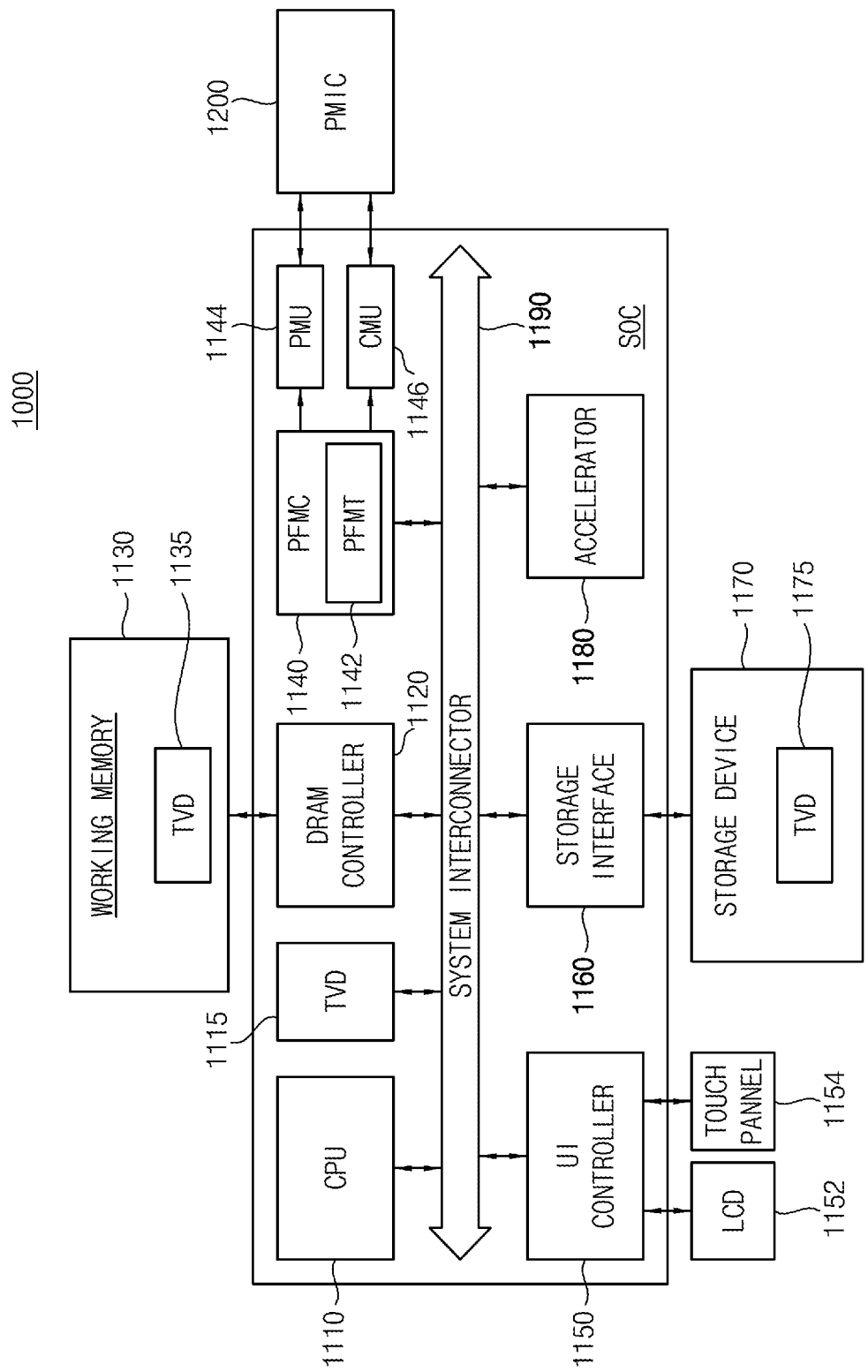
FIG. 22 is a block diagram illustrating a computing system according to some example embodiments.

FIG. 22 is a block diagram illustrating a computing system according to some example embodiments.

Referring to FIG. 22, a computing system 1000 may include a system on chip (SOC), a working memory 1130, a display device (LCD) 1152, a touch panel 1154, a storage device 1170, a power management integrated circuit (PMIC) 1200, etc. The SOC may include a central processing unit (CPU) 1110, a threshold voltage detection circuit TVD 1115, a DRAM controller 1120, a performance controller 1140, a user interface controller (UI controller) 1150, a storage interface 1160, an accelerator 1180, a power management unit (PMU) 1144, a clock management unit (CMU) 1146, etc. It will be understood that components of the computing system 1000 are not limited to the components shown in FIG. 22. For example, the computing system 1000 may further include a hardware codec for processing image data, a security block, or the like.

The CPU 1110 may execute software (for example, an application program, an operating system (OS), and device drivers) for the computing system 1000. The CPU 1110 may execute the OS which may be loaded into the working memory 1130. The CPU 1110 may execute various application programs to be driven on the OS. The CPU 1110 may be provided as a homogeneous multi-core processor or a heterogeneous multi-core processor. A multi-core processor is a computing component including at least two independently drivable processors (which may be referred to as "cores" or "processor cores"). Each of the cores may independently read and execute program instructions.

The processor cores of the CPU 1100 may be grouped into a plurality of clusters that operate with an independent driving clock and an independent driving voltage. The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

A kernel of the OS may monitor the number of tasks in a task queue and the driving voltage and the driving clock of the CPU 1110 at specific time intervals to control the CPU 1110. In addition, a kernel of the OS may control hotplug-in or hotplug-out of the CPU 1110 with reference to the monitored information.

The DRAM controller 1120 may provide interfacing between the working memory 1130 and the SOC. The DRAM controller 1120 may access the working memory 1130 according to a request of the CPU 1110 or another intellectual property (IP) block.

The OS or basic application programs may be loaded into the working memory 1130 during a booting operation. For example, an OS image stored in the storage device 1170 may be loaded into the working memory 1130 based on a booting sequence during booting of the computing system 1000. Overall input/output operations of the computing system 1000 may be supported by the OS. The working memory 1130 may be a volatile memory such as a static random access memory (SRAM) and a dynamic random access memory (DRAM) or a nonvolatile memory device such as a phase-change random-access memory (PRAM), a magneto-resistive random-access memory (MRAM), a resistive random-access memory (ReRAM), a ferroelectric random-access memory (FRAM), and a NOR flash memory. In some example embodiments, the working memory 1130 may include a threshold voltage detection circuit 1135 as described above.

The performance controller 1140 may adjust operation parameters of the SOC according to a control request provided from the kernel of the OS. For example, the performance controller 1140 may adjust the level of DVFS to enhance performance of the SOC. Alternatively, the performance controller 1140 may generate the frequency selection signals and may control the frequencies of the processor cores according to a request of the kernel. In this case, the performance controller 1140 may include a performance table PFMT 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 may control user input and output from user interface devices. For example, the user interface controller 1150 may display a keyboard screen for inputting data to the LCD 1152 according to the control of the CPU 1110. Alternatively, the user interface controller 1150 may control the LCD 1152 to display data that a user requests. The user interface controller 1150 may decode data provided from user input means, such as the touch panel 1154, into user input data.

The storage interface 1160 may access the storage device 1170 according to a request of the CPU 1110. For example, the storage interface 1160 may provide interfacing between the SOC and the storage device 1170. For example, data processed by the CPU 1110 may be stored in the storage device 1170 through the storage interface 1160. Alternatively, data stored in the storage device 1170 may be provided to the CPU 1110 through the storage interface 1160.

The storage device 1170 may be provided as a storage medium of the computing system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory. In some example embodiments, the storage device 1170 may include a threshold voltage detection circuit 1175 as described above.

The accelerator 1180 may be provided as a separate intellectual property (IP) component to increase the processing speed of a multimedia or multimedia data. For example, the accelerator 1180 may be provided as an intellectual property (IP) component to enhance processing performance of text, audio, still images, animation, video, two-dimensional data or three-dimensional data.

A system interconnector 1190 may be a system bus to provide an on-chip network in the SOC. The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus may provide a path along which a control signal is transmitted between intellectual properties (IPs). However, the configuration of the system interconnector 1190 is not limited to the above description and the system interconnector 190 may further include arbitration means for efficient management.

The threshold voltage detection circuits 1115, 1135 and 1177 may be implemented as on-chip circuits to monitor variation of the threshold voltage of the transistor in the corresponding component. The operation of the computing system 1000 may be controlled efficiently based on the digital output codes provided from the threshold voltage detection circuits 1115, 1135 and 1177. The operation conditions, the operation timings of the working memory 1130, the SOC, the storage device 1170 may be controlled based on the detected changes of the threshold voltages.

As described above, the high-sensitivity delay cell according to some example embodiments may reduce area overhead and increase delay time variation according to threshold voltage variation of the transistor by increasing sensitivity to the threshold voltage, using reconfigurable pass transistors. In addition, the high-sensitivity delay cell may operate robustly even at a low operation voltage by increasing the overdrive voltage using the boosting capacitor.

The circuit of detecting threshold voltage according to some example embodiments may detect (e.g., detect more precisely) the threshold voltage of the transistor and operate (e.g., operate robustly) even at a low operation voltage, using the high-sensitivity delay cell. In addition, the circuit of detecting threshold voltage may operate robustly despite changes in the operation clock frequency over a wide frequency range by adopting a digital delay-locked loop scheme.

The inventive concepts of the present disclosure may be applied to any semiconductor integrated circuits and systems including transistors. For example, the inventive concepts of the disclosure may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, or the like.

The foregoing is illustrative of some examples of embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A circuit of detecting threshold voltage comprising:
   a first delay circuit having a first sensitivity to a threshold voltage of a transistor, the first delay circuit configured to receive an input signal and a digital control code and configured to generate a first output signal that is delayed with respect to the input signal by a first delay time that is changeable based on the digital control code;
   a second delay circuit having a second sensitivity that is higher than the first sensitivity, the second delay circuit configured to receive the input signal and configured to generate a second output signal delayed with respect to the input signal by a second delay time; and
   a controller configured to compare the first output signal and the second output signal by changing the digital control code and configured to generate a digital output code corresponding to the digital control code in response to the first delay time being equal to the second delay time, such that the digital output code indicates the threshold voltage of the transistor,
   wherein the controller includes:
   a pulse generator configured to generate an input pulse signal based on an input clock signal and configured to provide the input pulse signal as the input signal;
   a phase detector configured to generate a phase detection signal by comparing a phase of the first output signal and a phase of the second output signal; and
   a counter circuit configured to increment or decrement a value of the digital control code depending on a logic level of an up-down signal.

2. The circuit of claim 1, wherein the controller further includes
   a control logic circuit configured to generate the up-down signal based on the phase detection signal.

3. The circuit of claim 2, wherein the phase detector includes:
   a bang-bang phase detector configured to generate the phase detection signal based on latching a logic level of the first output signal in synchronization with an edge of the second output signal.

4. The circuit of claim 2, wherein the phase detection signal has a first logic level when the phase of the first output signal precedes the phase of the second output signal and has a second logic level when the phase of the first output signal lags behind the phase of the second output signal.

5. The circuit of claim 4, wherein the counter circuit is configured to increase the value of the digital control code when the phase detection signal has the first logic level and is configured to decrease the value of the digital control code when the phase detection signal has the second logic level.

6. The circuit of claim 2, wherein the control logic circuit is configured to generate a lock signal that is activated in response to an edge of the phase detection signal and is configured provide the digital control code as the digital output code in response to activation of the lock signal.

7. The circuit of claim 2, wherein the counter circuit is configured to increase or decrease the value of the digital control code depending on a logic level of the phase detection signal per cyclic period of the input clock signal.

8. The circuit of claim 2, wherein the control logic circuit is configured to generate a mode signal indicating an N-type metal oxide semiconductor (NMOS) detection mode to detect a threshold voltage of an NMOS transistor or a P-type metal oxide semiconductor (PMOS) detection mode to detect a threshold voltage of a PMOS transistor.

9. The circuit of claim 8, wherein the counter circuit includes:
   an NMOS up-down counter configured to be enabled in the NMOS detection mode based on the mode signal to generate the digital control code and store the digital output code indicating the threshold voltage of the NMOS transistor; and
   a PMOS up-down counter configured to be enabled in the PMOS detection mode based on the mode signal to generate the digital control code and store the digital output code indicating the threshold voltage of the PMOS transistor.

10. The circuit of claim 8, wherein the pulse generator is configured to generate a negative pulse signal based on the input clock signal in the NMOS detection mode such that the negative pulse signal is activated in a logic low level, and configured to generate a positive pulse signal based on the input clock signal in the PMOS detection mode such that the positive pulse signal is activated in a logic high level.

11. The circuit of claim 8, wherein the pulse generator includes:
   a delay circuit configured to generate an inverted-delayed clock signal by inverting and delaying the input clock signal;
   a logic gate configured to generate a pulse signal by performing a logic operation on the input clock signal and the inverted-delayed clock signal; and an output circuit configured to provide the pulse signal or an inverted signal of the pulse signal as the input pulse signal in response to the mode signal.

12. The circuit of claim 1, wherein, in response to a mode signal indicating an NMOS detection mode to detect a threshold voltage of an NMOS transistor or a PMOS detection mode to detect a threshold voltage of a PMOS transistor, the second delay circuit is configured to have the second sensitivity to the threshold voltage of the NMOS transistor in the NMOS detection mode and have the second sensitivity to the threshold voltage of the PMOS transistor in the PMOS detection mode.

13. The circuit of claim 1, wherein the first delay circuit includes:
a first delay line including a plurality of normal delay cells having the first sensitivity connected in series and configured to generate a plurality of delay signals having different delay times with respect to the input signal; and
a selector configured to select one of the plurality of delay signals based on the digital control code and configured to provide a selected delay signal as the first output signal.

14. The circuit of claim 13, wherein the controller is configured to increase a value of the digital control code when the first delay time is smaller than the second delay time and configured to decrease the value of the digital control code when the first delay time is greater than the second delay time.

15. The circuit of claim 1, wherein the second delay circuit includes:
a second delay line including a plurality of high-sensitivity delay cells having the second sensitivity connected in series and configured to generate the second output signal.

16. The circuit of claim 15, wherein each high-sensitivity delay cell of the plurality of high-sensitivity delay cells includes:
a first PMOS transistor connected between a cell input node and a first node and having a gate electrode that is configured to receive a mode signal;
a first NMOS transistor connected in parallel with the first PMOS transistor between the cell input node and the first node and having a gate electrode that is configured to receive the mode signal;
a buffer circuit connected between the cell input node and a second node;
a boosting capacitor connected between the first node and the second node;
a second PMOS transistor connected between a power supply voltage and a third node and having a gate electrode connected to the first node;
a second NMOS transistor connected between a ground voltage and the third node and having a gate electrode connected to the first node;
a third PMOS transistor connected between the power supply voltage and a cell output node and having a gate electrode connected to the third node; and
a third NMOS transistor connected between the ground voltage and the cell output node and having a gate electrode connected to the third node.

17. The circuit of claim 16, wherein the first NMOS transistor is turned on and a sensitivity to a threshold voltage of the second NMOS transistor increases in response to the mode signal having a logic high level, and wherein the first PMOS transistor is turned on and a sensitivity to a threshold voltage of the second PMOS transistor increases in response to the mode signal having a logic low level.

18. A circuit of detecting threshold voltage comprising:
a pulse generator configured to generate an input pulse signal based on an input clock signal;
a first delay circuit having a first sensitivity to a threshold voltage of a transistor, the first delay circuit configured to receive the input pulse signal and a digital control code and configured to generate a first output signal delayed with respect to the input pulse signal by a first delay time that changes depending on the digital control code;
a second delay circuit having a second sensitivity higher than the first sensitivity, the second delay circuit configured to receive the input pulse signal and configured to generate a second output signal delayed by a second delay time with respect to the input pulse signal;
a phase detector configured to generate a phase detection signal by comparing a phase of the first output signal and a phase of the second output signal; and
a control logic circuit configured to generate the digital control code that increases or decreases depending on a logic level of the phase detection signal, the control logic circuit including a counter circuit configured to increment or decrement a value of the digital control code.

19. A high-sensitivity delay cell comprising:
a first P-type metal oxide semiconductor (PMOS) transistor connected between a cell input node and a first node and having a gate electrode configured to receive a mode signal;
a first N-type metal oxide semiconductor (NMOS) transistor connected in parallel with the first PMOS transistor between the cell input node and the first node and having a gate electrode configured to receive the mode signal;
a buffer circuit connected between the cell input node and a second node;
a boosting capacitor connected between the first node and the second node;
a second PMOS transistor connected between a power supply voltage and a third node and having a gate electrode connected to the first node;
a second NMOS transistor connected between a ground voltage and the third node and having a gate electrode connected to the first node;
a third PMOS transistor connected between the power supply voltage and a cell output node and having a gate electrode connected to the third node; and
a third NMOS transistor connected between the ground voltage and the cell output node and having a gate electrode connected to the third node.

20. The high-sensitivity delay cell of claim 19, wherein a sensitivity to threshold voltages of the first NMOS transistor and the second NMOS transistor increases in response to the mode signal having a logic high level, and
wherein a sensitivity to threshold voltages of the first PMOS transistor and the second PMOS transistor increases in response to the mode signal having a logic low level.

* * * * *